(12) United States Patent
Yan

(10) Patent No.: US 10,657,943 B2
(45) Date of Patent: May 19, 2020

(54) SYSTEMS AND METHODS FOR CALIBRATING A MUSICAL DEVICE

(71) Applicant: SUNLAND INFORMATION TECHNOLOGY CO., LTD., Shanghai (CN)

(72) Inventor: Bin Yan, Shanghai (CN)

(73) Assignee: SUNLAND INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/163,804

(22) Filed: Oct. 18, 2018

(65) Prior Publication Data
US 2019/0051277 A1     Feb. 14, 2019

Related U.S. Application Data

(63) Continuation of application No. PCT/CN2017/000024, filed on Jan. 3, 2017, which is
(Continued)

(30) Foreign Application Priority Data

Jan. 15, 2016  (CN) .......................... 2016 1 0027133
Jan. 15, 2016  (CN) .......................... 2016 1 0027147
(Continued)

(51) Int. Cl.
*G10H 1/44*     (2006.01)
*G10H 1/00*     (2006.01)
(Continued)

(52) U.S. Cl.
CPC ............... *G10H 1/44* (2013.01); *G01P 13/00* (2013.01); *G09B 15/00* (2013.01); *G10C 3/00* (2013.01);
(Continued)

(58) Field of Classification Search
CPC ........ G10H 1/44; G10H 1/0008; G10H 1/344; G10H 1/0016; G10H 2220/201;
(Continued)

(56) References Cited

U.S. PATENT DOCUMENTS 4,970,928 A * 11/1990 Tamaki .................... G10C 3/20
                                                      84/115
5,324,883 A     6/1994 Kondo
(Continued)

FOREIGN PATENT DOCUMENTS

CN       2646826 Y     10/2004
CN     101604486 A     12/2009
(Continued)

OTHER PUBLICATIONS

International Search Report in PCT/CN2016/080224 dated Oct. 20, 2016, 5 pages.
(Continued)

*Primary Examiner* — Jeffrey Donels
(74) *Attorney, Agent, or Firm* — Metis IP LLC

(57) ABSTRACT

The present disclosure relates to a method and system for calibrating a musical device. In some embodiments, a method for calibrating a musical device includes: energizing an actuator to actuate a key using a force corresponding to a first intensity level; obtaining, from a sensor, a first sensor signal representing motion information of the key corresponding to application of the force; and calibrating the musical device based on the first sensor signal.

19 Claims, 13 Drawing Sheets

Related U.S. Application Data a continuation of application No. PCT/CN2016/080224, filed on Apr. 26, 2016.

(30) Foreign Application Priority Data

| Jan. 15, 2016 | (CN) | .......................... 2016 1 0027156 |
| Jan. 15, 2016 | (CN) | .......................... 2016 1 0028648 |
| Jan. 15, 2016 | (CN) | .......................... 2016 1 0028650 |
| Jan. 15, 2016 | (CN) | .......................... 2016 1 0028718 |
| Jan. 28, 2016 | (CN) | .......................... 2016 1 0059034 |
| Jan. 28, 2016 | (CN) | ...................... 2016 2 0088254 U |
| Apr. 7, 2016 | (CN) | .......................... 2016 1 0213505 |

(51) Int. Cl.

| G09B 15/00 | (2006.01) |
| G10C 3/00 | (2019.01) |
| G10H 1/34 | (2006.01) |
| G01P 13/00 | (2006.01) |
| G10C 3/20 | (2006.01) |
| G10F 1/02 | (2006.01) |
| G10C 3/12 | (2006.01) |

(52) U.S. Cl.
CPC ................. *G10C 3/12* (2013.01); *G10C 3/20* (2013.01); *G10F 1/02* (2013.01); *G10H 1/00* (2013.01); *G10H 1/0008* (2013.01); *G10H 1/0016* (2013.01); *G10H 1/344* (2013.01); *G10H 2220/015* (2013.01); *G10H 2220/091* (2013.01); *G10H 2220/201* (2013.01); *G10H 2220/221* (2013.01); *G10H 2220/275* (2013.01); *G10H 2220/305* (2013.01); *G10H 2230/011* (2013.01)

(58) Field of Classification Search
CPC ....... G10H 2220/275; G10H 2220/091; G10H 2220/221; G10H 2220/015; G10H 2220/305; G10H 2230/011; G10H 1/00; G10C 3/12; G10C 3/20; G10C 3/00; G01P 13/00; G10F 1/02; G09B 15/00
USPC .......................................................... 84/200
See application file for complete search history.

(56) References Cited

U.S. PATENT DOCUMENTS

| 5,880,393 | A | 3/1999 | Kaneko et al. | |
| 5,908,997 | A | 6/1999 | Arnold et al. | |
| 6,069,310 | A | 5/2000 | James | |
| 6,084,167 | A | 7/2000 | Akimoto et al. | |
| 6,160,213 | A | 12/2000 | Arnold et al. | |
| 6,297,437 | B1* | 10/2001 | Ura | G10H 1/0553 84/18 |
| 6,359,207 | B1* | 3/2002 | Oba | G10G 3/04 84/20 |
| 6,362,405 | B2 | 5/2002 | Koseki et al. | |
| 6,388,181 | B2 | 5/2002 | Moe | |
| 6,392,132 | B2 | 5/2002 | Uehara | |
| 6,472,589 | B1* | 10/2002 | Lee | G10F 1/02 84/21 |
| 6,476,304 | B2 | 11/2002 | Uehara | |
| 6,921,856 | B2 | 7/2005 | Koseki | |
| 7,094,961 | B2 | 8/2006 | Ura et al. | |
| 7,297,858 | B2 | 11/2007 | Paepcke | |
| 7,361,829 | B2 | 4/2008 | Uehara | |
| 7,435,895 | B2 | 10/2008 | Muramatsu | |
| 7,718,871 | B1 | 5/2010 | Stahnke | |
| 7,723,598 | B2 | 5/2010 | Sasaki et al. | |
| 7,893,337 | B2 | 2/2011 | Lenz | |
| 8,253,006 | B2 | 8/2012 | Kim | |
| 8,338,684 | B2 | 12/2012 | Pillhofer et al. | |
| 8,502,059 | B2 | 8/2013 | Sasaki et al. | |
| 9,958,314 | B2 | 5/2018 | Oba et al. | |
| 2005/0145104 | A1 | 7/2005 | Sasaki | |
| 2005/0204908 | A1 | 9/2005 | Uehara | |
| 2006/0065103 | A1 | 3/2006 | Sasaki | |
| 2006/0162534 | A1* | 7/2006 | Muramatsu | G01D 18/006 84/724 |
| 2006/0272483 | A1 | 12/2006 | Honeywell | |
| 2007/0163426 | A1 | 7/2007 | Eitaki | |
| 2007/0214944 | A1 | 9/2007 | Sasaki et al. | |
| 2007/0221035 | A1* | 9/2007 | Muramatsu | G10F 1/02 84/13 |
| 2008/0092720 | A1* | 4/2008 | Yamashita | G10C 3/00 84/600 |
| 2010/0077905 | A1 | 4/2010 | Hammond | |
| 2010/0229707 | A1 | 9/2010 | Sasaki | |
| 2014/0130652 | A1 | 5/2014 | Oba et al. | |
| 2014/0222436 | A1 | 8/2014 | Binder et al. | |

FOREIGN PATENT DOCUMENTS

| CN | 101916560 A | 12/2010 |
| CN | 102262873 A | 11/2011 |
| CN | 102479501 A | 5/2012 |
| CN | 103093803 A | 5/2013 |
| CN | 103150940 A | 6/2013 |
| CN | 103247200 A | 8/2013 |
| CN | 103354092 B | 10/2013 |
| CN | 103594105 A | 2/2014 |
| CN | 203422918 U | 2/2014 |
| CN | 103903602 A | 7/2014 |
| CN | 103903603 A | 7/2014 |
| CN | 103943094 A | 7/2014 |
| CN | 104157276 A | 11/2014 |
| CN | 104200716 A | 12/2014 |
| CN | 104835485 A | 6/2015 |
| CN | 105702120 A | 6/2016 |
| CN | 205388737 U | 7/2016 |
| CN | 105895066 A | 8/2016 |
| CN | 106981223 A | 7/2017 |
| CN | 106981233 A | 7/2017 |
| CN | 106981278 A | 7/2017 |
| CN | 106981279 A | 7/2017 |
| CN | 106981282 A | 7/2017 |
| CN | 106981283 A | 7/2017 |
| CN | 107016983 A | 8/2017 |
| JP | H10301567 A | 11/1998 |
| KR | 101524279 B1 | 6/2015 |
| WO | 2015105092 A1 | 7/2015 |

OTHER PUBLICATIONS

Written Opinion in PCT/CN2016/080224 dated Oct. 20, 2016, 6 pages.
First Office Action in Chinese Application No. 201610213505.5 dated Dec. 28, 2017, 17 pages.
International Search Report in PCT/CN2017/000024 dated Apr. 12, 2017, 5 pages.
Written Opinion in PCT/CN2017/000024 dated Apr. 12, 2017, 4 pages.
International Search Report in PCT/CN2017/072480 dated Apr. 27, 2017, 5 pages.
Written Opinion in PCT/CN2017/072480 dated Apr. 27, 2017, 4 pages.

* cited by examiner

SYSTEMS AND METHODS FOR CALIBRATING A MUSICAL DEVICE

CROSS-REFERENCE TO RELATED APPLICATIONS

This application is a Continuation of International Application No. PCT/CN2017/000024, filed on Jan. 3, 2017, which claims priority to International Application No. PCT/CN2016/080224 filed on Apr. 26, 2016, which claims priority of Chinese Application No. 201610028648.9 filed on Jan. 15, 2016, Chinese Patent Application No. 201610028650.6 filed on Jan. 15, 2016, Chinese Patent Application No. 201610027133.7 filed on Jan. 15, 2016, Chinese Patent Application No. 201610027147.9 filed on Jan. 15, 2016, Chinese Patent Application No. 201610027156.8 filed on Jan. 15, 2016, Chinese Patent Application No. 201610028718.0 filed on Jan. 15, 2016, Chinese Patent Application No. 201610059034.7 filed on Jan. 28, 2016, Chinese Patent Application No. 201620088254.8 filed on Jan. 28, 2016, and Chinese Patent Application No. 201610213505.5 filed on Apr. 7, 2016, the entire content of each of which are incorporated herein by reference.

TECHNICAL FIELD

This present disclosure generally relates to a musical system, and more particularly, to a system and method for calibrating a musical system.

BACKGROUND

A keyboard instrument is a musical instrument played using a keyboard. A piano (e.g., an acoustic piano) is a typical keyboard instrument. The piano may include a protective case, a soundboard, metal strings, hammers, keys (e.g., white keys and black keys), and pedals. Each key may be mechanically connected to a hammer, which is constructed to strike a metal string(s). When a key of the acoustic piano is pressed by a player, the corresponding hammer may strike the corresponding metal string(s). Excited by the strike, the string(s) may respond with vibrations with various frequencies. These vibrations may be transmitted to the soundboard. Those that have the same frequencies of the resonant frequency of the soundboard may be amplified by coupling the acoustic energy to the air. When a pedal of the piano (e.g., a sustain pedal) is applied, the metal string may keep vibrating until internal and external damping forces of the metal string gradually consume the vibration energy. Accordingly, a note produced by the piano may be sustained even when the keys are released.

SUMMARY

In one aspect of the present disclosure, a system is provided. The system includes a processor and a memory storing a first set of instructions for calibrating a musical device. When executing the first set of instructions, the processor is detected to: energize an actuator to actuate a key using a force corresponding to a first intensity level; obtain, from a sensor, a first sensor signal representing motion information of the key corresponding to application of the force; and calibrate the musical device based on the first sensor signal.

In another aspect of the present disclosure, a method is provided. The method is related to the method of calibrating a musical device. The method includes energizing an actuator to actuate a key using a force corresponding to a first intensity level; obtaining, from a sensor, a first sensor signal representing motion information of the key corresponding to the application of the force; and calibrating the musical device based on the first sensor signal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "unit," "module," "engine" and/or "system" used herein are one method to distinguish different components, elements, parts, section or assembly of different level in ascending order. However, the terms may be displaced by another expression if they may achieve the same purpose.

It will be understood that when a unit, a module or an engine is referred to as being "on," "connected to" or "coupled to" another unit, another module, or another engine, it may be directly on, connected or coupled to, or communicate with the other unit, another module, or another engine, or an intervening unit, an intervening module, or an intervening engine may be present, unless the context clearly indicates otherwise. As used herein, the term "and/or" includes any and all combinations of one or more of the associated listed items.

The terminology used herein is for the purposes of describing particular examples and embodiments only and is not intended to be limiting. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The present disclosure provides a system and a method for calibrating a musical system. The musical system may include a piano, a violin, a viola, a cello, a bass, an erhu, a lute, a harp, a guitar, or the like. For example, the musical system may include a string instrument that makes sound by string vibration. Merely by way of example, the musical system may be a smart piano.

Figure 1:
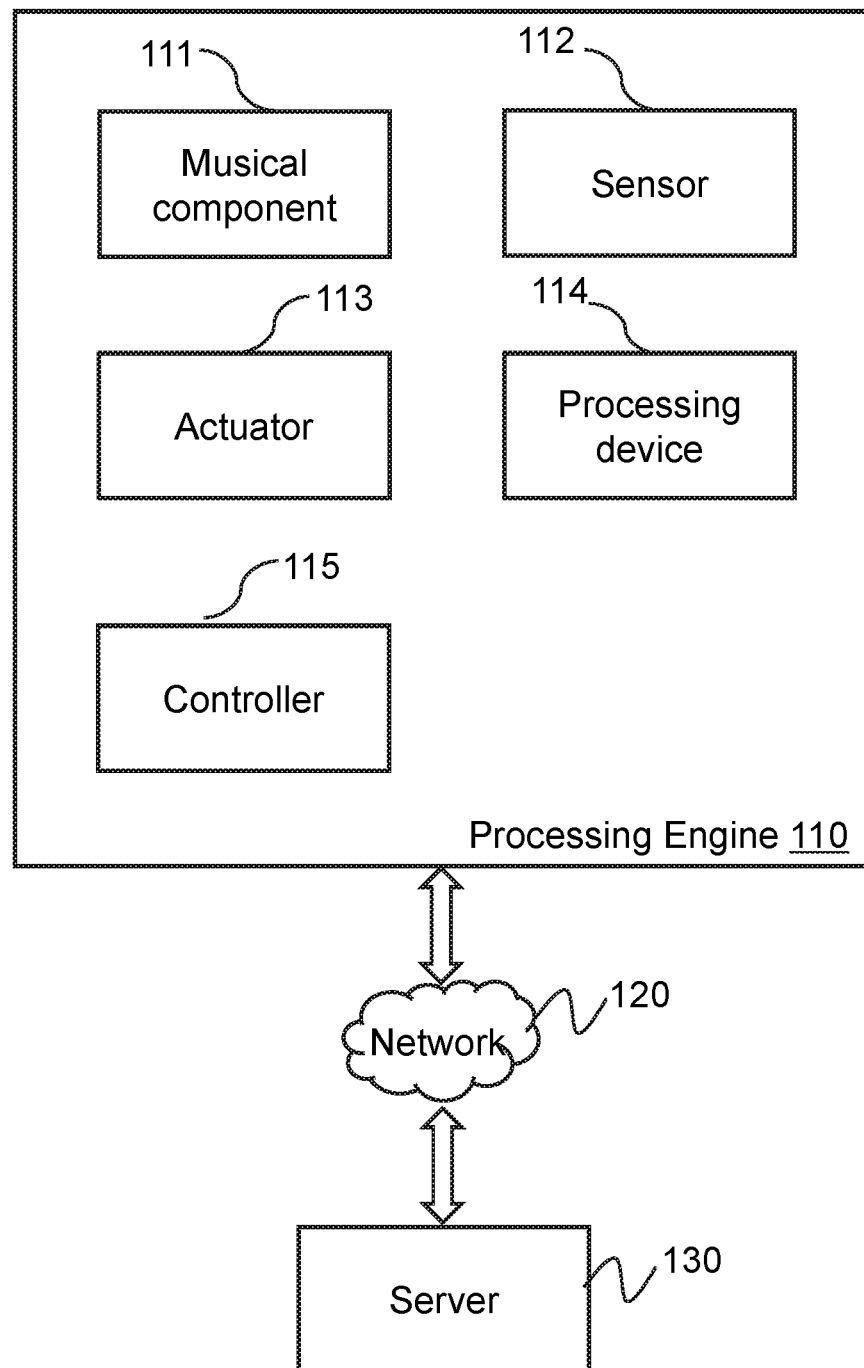
FIG. 1 is a block diagram illustrating an exemplary musical system according to some embodiments of the present disclosure.

FIG. 1 is a block diagram illustrating an exemplary musical system 100 according to some embodiments of the present disclosure. In some embodiments, the musical system 100 may include a piano, such as an acoustic piano, an electric piano, an electronic piano, a digital piano, and/or any other musical instrument with a keyboard. A non-exclusive list of an acoustic piano that may be used in connection with some embodiments of the present disclosure may include a grand piano, an upright piano, a square piano, a specialized piano (such as a toy piano, a mini piano, a prepared piano, etc.), etc.

As shown in FIG. 1, the musical system 100 may include a processing engine 110, a network 120, and a server 130. The processing engine 110 may include a musical component 111, one or more sensors 112, an actuator 113, a processing device 114, and a controller 115.

The musical component 111 may include one or more keyboard musical instruments. As referred to herein, a keyboard musical instrument may be and/or include any musical instrument with a keyboard. Exemplary keyboard musical instrument may include a piano (e.g., an acoustic piano), an organ (e.g., a pipe organ, a Hammond organ, etc.), an accordion, an electronic keyboard, a synthesizer, a musical instrument digital interface (MIDI) keyboard, or the like, or a combination thereof. In some embodiments, the musical component 111 may include one or more portions of a keyboard musical instrument. A portion of a key-based musical instrument may be and/or include, for example, a key of a piano (e.g., a white key or a black key), a hammer, a pedal, a protective case, a soundboard, a metal string, or the like, or a combination thereof. In some embodiments, the musical component 111 may be communicatively coupled to one or more other devices of the processing engine 110 (e.g., the sensor 112, the actuator 113, the processing device 114, or the controller 115).

The sensor(s) 112 may be configured to detect motion information relating to the musical component 111. The motion information may include a sequence of keys and/or pedals that may be pressed according to a musical score, a motion state of a key or a pedal (e.g., a position of the key/pedal, a velocity of the key/pedal, an acceleration of the key/pedal, or the like), timing information relating to the motion state of the key/pedal (e.g., a time instant corresponding to the motion state of the key/pedal), or the like, or a combination thereof. In some embodiments, actuating a key/pedal may include pressing a key/pedal, releasing a key/pedal, striking a key/pedal, or the like, or a combination thereof. In some embodiments, the sensor 112 may generate a sensor signal based on the motion information of the key/pedal. The sensor signal may be an electric signal, such as a current signal, a voltage signal, etc. The current signal may be a direct current signal or an alternating current signal. In some embodiments, the value of the sensor signal may represent the motion information of the corresponding key or the pedal being pressed or released. In some embodiments, the value of the sensor signal may represent a volume of a sound generated by the corresponding key or pedal. In some embodiments, the processing engine 110 may include one or more volume analyzers (not shown in FIG. 1) for analyzing volumes of sounds generated by the musical system 100. Each of the volume analyzers may correspond to a key or a pedal.

In some embodiments, the sensor(s) 112 may include an optoelectronic sensor, an accelerometer, a magneto-electric sensor, a piezo-electric sensor, an angle sensor, or the like, or any combination thereof. The optoelectric sensor may emit a light used for acquiring an optoelectric signal. The light may include a visible light and an invisible radiation including, a gamma ray, an X-ray, ultraviolet, an infrared, or the like, or a combination thereof. The magneto-electric sensor may be a Hall sensor. The piezo-electric sensor may use piezoelectric effect to measure changes in pressure, acceleration, velocity, temperature, strain, force, or the like, by converting them to an electrical charge.

In some embodiments, the sensor(s) 112 may include a key sensor and a pedal sensor. In some embodiments, the processing engine 110 may include multiple key sensors and/or pedal sensors. Each key sensor may correspond to a key, and each pedal sensor may correspond to a pedal. Merely by way of example, the key sensor may generate an electric signal representative of a motion state of a corresponding key. In some embodiments, the key sensor and/or the pedal sensor may be coupled to the key and/or the pedal. For example, the key sensor and/or the pedal sensor may be installed above or below the key and/or the pedal. In some embodiments, one or more sensor(s) 112 can generate sensor data indicative of depression of a key and/or pedal based on motion information of the key and/or pedal. For example, sensor(s) 112 can generate the sensor data in response to detecting motion information corresponding to the depression of the key and/or pedal (e.g., a value of a sensor signal that is greater than a reference value). As another example, sensor(s) 112 can generate the sensor data by generating a sensor signal representing motion information of the key and/or pedal. The sensor data can include any suitable data that can be used to indicate depression of the key and/or pedal, such as a Boolean value (e.g., "True," "False," etc.), a binary value (e.g., "0," "1," etc.), one or more numbers, one or more portions of a sensor signal (e.g., sensor signal 280 of FIG. 2E), and/or any other suitable data.

The actuator 113 may be configured to actuate the keys and/or pedals of the musical component 111. In some embodiments, the actuator 113 may strike the keys and/or operate the pedals according to a musical instruction. As used herein, a musical instruction may refer to any information relating to a piece of music (e.g., a piano piece). The musical instruction may include a musical sheet, a musical score, an annotation, a musical note, a title of the music score, an operation sequence of keys and/or pedals, an endurance, a strength of a force applied to a key or a pedal, or the like, or a combination thereof. In some embodiments, the actuator 113 may receive the musical instruction from the processing device 114, the controller 115, the server 130, a user, or any other device. For example, when the actuator 113 receives a musical instruction of applying a force with a specific strength of a key, the actuator 113 may apply the force to the key based on the musical instruction.

In some embodiments, the actuator(s) 113 may include a key actuator (not shown in FIG. 1) and a pedal actuator (not shown in FIG. 1). In some embodiments, the processing engine 110 may include multiple key actuators and/or pedal actuators. Each key actuator may correspond to one or more keys. Each pedal actuator may correspond to one or more pedals. In some embodiments, one or more of the key actuators and/or the pedal actuators may be operated by one or more solenoids. In some embodiments, a key actuator and/or a pedal actuator may be coupled to its corresponding keys and/or pedals. For example, the key actuator and/or the pedal actuator may be installed above or below the keys and/or the pedals.

In some embodiments, the actuator(s) 113 may actuate one or more keys, pedals and/or any other component of the musical system with controlled forces. For example, the actuator(s) 113 can apply forces to one or more keys and/or pedals of the piano corresponding to one or more intensity levels. As used herein, an intensity level may correspond to an amount of a force applied to a component of a musical system (e.g., a key, a pedal, etc. of a musical device) and/or an amount of force used to actuate the component by the actuator(s) 113. For example, an intensity level can correspond to 5 newtons, 5.4 newtons, 10 newtons, etc. In some embodiments, a higher intensity level may correspond to a greater force while a lower intensity level may correspond to a less force. Alternatively, a lower intensity level may correspond to a greater force while a higher intensity level may correspond to a less force. In some embodiments, an intensity level may be represented by one or more numbers, letters, symbols, characters, and/or any other value. For example, multiple intensity levels may be referred to as intensity level 0, intensity level 1, intensity level 2, etc. As another example, multiple intensity levels may be referred to as intensity level A, intensity level B, etc. Multiple intensity levels may correspond to multiple forces. Two intensity levels may or may not correspond to the same amount of force.

In some embodiments, a component of the musical system may be actuated using forces corresponding to multiple intensity levels. The intensity levels may fall within an interval defined by a lower limit and an upper limit. The lower limit and the upper limit may correspond to a minimum intensity level and a maximum intensity level, respectively. As used herein, a minimum intensity level may refer to a lower limit of multiple intensity levels. For example, intensity level 0 may be regarded as being the minimum intensity level of intensity level 0, intensity level 1, . . . , and intensity level n, where n is a positive integer. In some embodiments, the minimum intensity level may correspond to an amount of force that may be used to move a component of the musical system (e.g., pressing a key). In some embodiments, the minimum intensity level may correspond to a minimum force required to move the component. As referred to herein, a maximum intensity level may refer to an upper limit of multiple intensity levels. For example, intensity level n may be regarded as being the maximum intensity level of intensity level 0, intensity level 1, . . . , and intensity level n, where n is a positive integer.

In some embodiments, an intensity level of a force applied to the key or the pedal may be represented by a control signal (e.g., an excitation current of a coil) that can be used to drive the actuator 113. For example, a value of the control signal (e.g., an amplitude) may indicate a value of an intensity level. More particularly, for example, a greater value of the control signal may correspond to a higher intensity level. In some embodiments, the driving signal may be a pulse-width modulation signal, a direct current signal, etc.

In some embodiments, for a specific key or a pedal, an intensity level may correspond to a particular volume of sound produced by the musical system 100. For example, a higher intensity level may correspond to a higher sound volume. As another example, a lower intensity level may correspond to a lower sound volume. The sound volume generated by the musical system 100 may be represented by a sensor signal (e.g., a current signal, a voltage signal, etc.) acquired by the sensor(s) 112. For example, a value of the sensor signal (e.g., an amplitude) may indicate a value of a sound volume. More particularly, for example, a greater value of the sensor signal may correspond to a higher sound volume.

In some embodiments, an intensity level may correspond to a MIDI level. A sensor signal and/or a sound volume may also correspond to a MIDI level. As used herein, "MIDI level" may contain information indicating a speed of a key that is actuated. The MIDI level may correspond to a speed of a key when a force corresponding to an intensity level is applied to the key. In some embodiments, a higher MIDI level may correspond to a greater speed while a lower MIDI level may correspond to a less speed. Alternatively, a lower MIDI level may correspond to a greater speed while a higher MIDI level may correspond to a less speed. In some embodiments, a MIDI level may be represented by one or more numbers, letters, symbols, characters, and/or any other value. For example, multiple MIDI levels may be referred to as MIDI level 0, intensity level 1, intensity level 2, etc. As another example, multiple MIDI levels may be referred to as MIDI level A, intensity level B, etc. Multiple MIDI levels may correspond to multiple speeds. Two MIDI levels may or may not correspond to the same value of speed.

The processing device 114 may be configured to process information and/or signals provided by the sensor(s) 112*a*, the actuator(s) 113, the controller 115, the server 130, and/or any other device. In some embodiments, the processing device 114 may analyze the motion information detected by the sensor(s) 112. For example, the processing device 114 may analyze velocities of a key over time. In some embodiments, the processing device 114 may calibrate the actuator(s) 113 and/or the sensor(s) 112. For example, the processing 114 may calibrate one or more keys and/or pedals based on one or more sensor signals and/or forces (e.g., forces corresponding to different intensity levels) applied to the key or pedal by the actuator 113. In some embodiments, the calibration may be performed by executing one or more processes 500-1000 of FIGS. 5-10 and/or one or more portions of these processes.

The controller 115 may be configured to control one or more components of the musical system 100 to perform various functions. For example, the controller 115 may generate a control signal to control the actuator(s) 113 to actuate a key with a certain intensity level. As another example, the controller 115 may generate a control signal to control the processing device 114 to perform a calibration of a key or a pedal.

In some embodiments, the processing device 114 or the controller 115 may include one or more processor-based and/or microprocessor-based units. Merely by way of example, the processor (e.g., a hardware processor) may include a microcontroller, a reduced instruction set computer (RISC), application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an acorn reduced instruction set computing (RISC) machine (ARM), any other circuit and/or processor capable of executing the functions described herein, the like, or any combination thereof.

The network 120 may be configured to facilitate communications between the processing engine 110 and the server 130. For example, the processing engine 110 may transmit data or information to the server 130 via the network 120. In some embodiments, the network 120 may include a wired network, a nanoscale network, a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof.

The server 130 may be configured to process information or data relating to the processing engine 110. In some embodiments, the server 130 may be local or remote to the processing engine 110. In some embodiments, the server 130 may be centralized (e.g., a data center) or distributed. In some embodiments, the server 130 may include a library (not shown). The library may store information corresponding to different users. The library may include a plurality of sections classified according to time (e.g., this week, last week, or next week, or the like). In some embodiments, the server 130 may include a server or a group of servers. In some embodiments, the server 130 may include a file server, a database server, an FTP (File Transport Protocol) server, an application server, a proxy server, a mail server, a cloud server, or the like, or any combination thereof. In some embodiments, the server 130 may provide a cloud storage.

In some embodiments, the musical system 100 may be further connected to an external device (e.g., an external data source). In some embodiments, the connection between the musical system 100 and the external device may include a wired connection or a wireless connection. The wired connection may include a cable, an optical fiber, an electric wire, or the like, or a combination thereof. The wireless connection may include a Wi-Fi connection, a Bluetooth connection, an infrared (IR) connection, radar, or the like, or a combination thereof. In some embodiments, the external device may include a smart phone, a laptop computer, a tablet processing device, a wearable processing device, a personal computer, a server, or the like, or a combination thereof.

It should be noted that the description of the musical system is provided for the purposes of illustration, and not intended to limit the scope of the present disclosure. For persons having ordinary skills in the art, various variations and modifications may be conducted under the teaching of the present disclosure. However, those variations and modifications may not depart from the protecting of the present disclosure. For example, the server 130 may be optional, and a local server may be integrated into the processing engine 110. As another example, the processing engine 110 may include a storage device or the components in the processing engine 110 may include a storage device respectively. As a further example, the components in the musical system 100 may be independent, or any part of the components may be integrated into one component to work integrally.

Figure 2A:
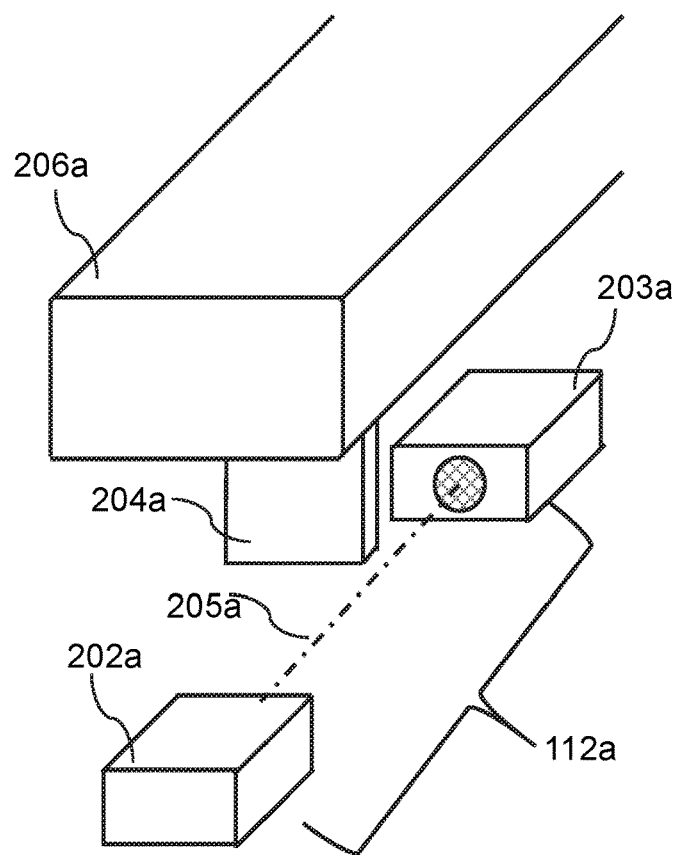
FIGS. 2A and 2B illustrate exemplary sensors according to some embodiments of the present disclosure.
Figure 2B:
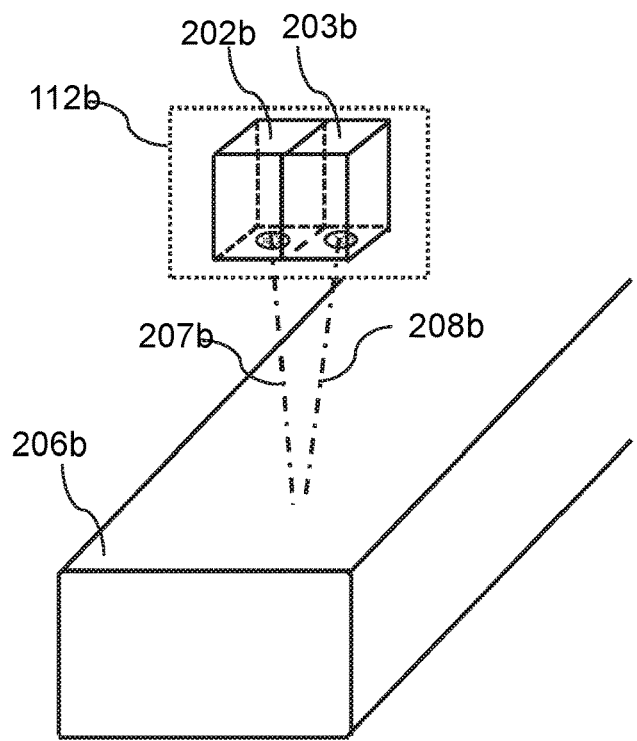

FIGS. 2A and 2B are diagrams illustrating mechanisms for generating sensor signals using exemplary sensors 112*a* and 112*b* according to some embodiments of the present disclosure. Sensors 112*a* and 112*b* may be the same as sensor 112 of FIG. 1. In some embodiments, each of sensors 112*a* and 112*b* may be and/or include an optoelectronic sensor.

As illustrated in FIG. 2A, sensor 112*a* may include a light-emitting element 202*a* and a light-detecting element 203*a*. An exemplary light-emitting element 202*a* may include a visible LED, a laser LED, an infrared LED, a laser diode (LD), a photocell, or the like, or a combination thereof. An exemplary light-detecting element 203*a* may include a phototube, an active-pixel sensor (APS), a bolometer, a charge-coupled device (CCD), a gaseous ionization detector, a photoresistor, a phototransistor, or the like, or a combination thereof. The light-emitting element 202*a* may generate light of various wavelengths. For example, the light-emitting element 202*a* may generate visible light, infrared light, ultraviolet (UV) light, etc. In some embodiments, the wavelength of a beam of light emitted by the light-emitting element 202*a* may be controlled by one or more motors using a Pulse Width Modulation (PWM) mechanism. The light-detecting element 203*a* may be configured to receive the light and to convert it into an electric signal (e.g., a current signal, a voltage signal, etc.).

In some embodiments, the light-emitting element 202*a* and the light-detecting element 203*a* may be positioned under a key 206*a*. In some embodiments, a non-transparent plate 204*a* may be coupled to the key 206*a*. The non-transparent plate 204*a* may partially or completely prevent the light-detecting element 203*a* from receiving the light emitted by the light-emitting element 202*a*. The non-transparent plate 204*a* may be coupled to a surface of the key 206a (e.g., the bottom of the key 206a). In some embodiments, the light-emitting element 202a may constantly emit light towards the light-detecting element 203a. The light-emitting element 202a may discontinuously emit light towards the light-detecting element 203a. For instance, there may be one or more time intervals between two light emissions. The one or more time intervals may be determined based on the velocity of the keys being actuated.

In some embodiments, a light beam 205a may be emitted by the light-emitting element 202a. When the key 206a is not pressed down, the key may stay at a "top" position. When a user presses the key 206a, the key may move downwards from the "top" position. When the key 206a does not go further, it reaches an "end" position. The non-transparent plate 204a may move along with the key 206a and may block one or more portions of the light beam 205a. The amount of the light detected by the light-detecting element 203a may vary due to the movement of the non-transparent plate 204. For example, when the key 206a moves toward the "end" position, the amount of light detected by the light-detecting element 203a may decrease. As another example, when the key 206a moves toward the "top" position, the amount of light detected by the light-detecting element 203a may increase. The light-detecting element 203a may determine the amount of the received light over time and may convert such information into one or more electric signals (e.g., one or more sensor signals).

Referring to FIG. 2B, in some embodiments, the non-transparent plate 204a may be omitted. A sensor 112b may include a light-emitting element 202b and a light-detecting element 203b. For instance, the light-emitting element 202b and the light-detecting element 203b may be placed above or beneath the key 206b. A light beam 202E emitted by the light-emitting element 202b may be projected towards the key 206b. The light beam 202E may be reflected by the key 206b once it reaches a surface of the key 206b (e.g., the upper surface, the bottom surface, etc.). The reflected light 208b may then travel towards the light-detecting element 203b and may be received by the light-detecting element 203b. When a user presses the key 206b, the key may move downwards from the "top" position to the "end" position. The distance that the light travels from the light-emitting element 202b to the light-detecting element 203b may vary due to various motion states of the key. The light-detecting element 203b may determine the time between light emission and light reception to record the change in distance that the light travels. The change in distance may be converted into one or more electric signals by the light-detecting element 203b. Thus, the motions of the key may be detected by the sensor 112b.

It should be noted that mechanisms for detecting motions of a key of a piano using a sensor described herein is not exhaustive and not limiting. Numerous other changes, substitutions, variations, alterations, and modifications may be ascertained to one skilled in the art and it is intended that the present disclosure encompasses all such changes, substitutions, variations, alterations, and modifications as falling within the scope of the present disclosure. In some embodiments, the sensors 112a and 112b may be placed in different positions. In some embodiments, the sensors 112a and/or 112b may or may not be attached to a key. In some embodiments, the sensors 112a and/or 112b may be placed in proximity to a key.

Figure 2C:
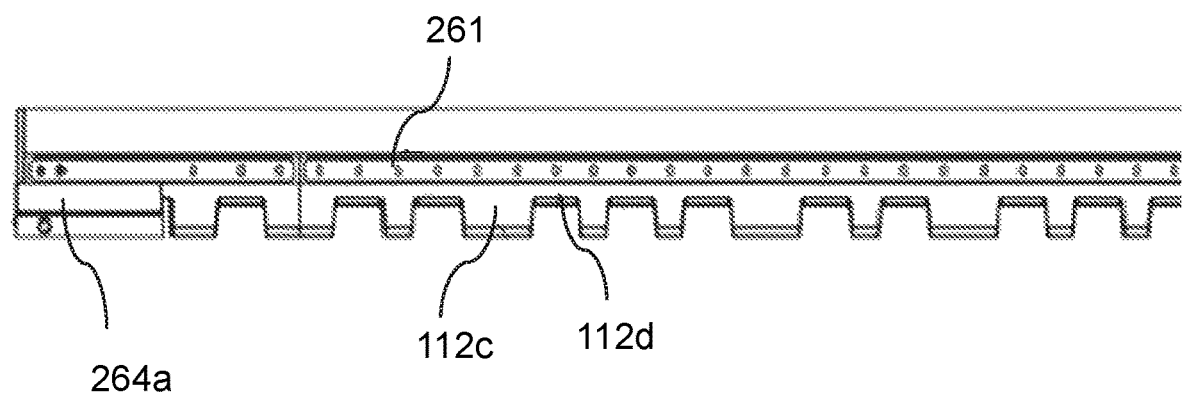
FIG. 2C illustrates configuration of exemplary sensors according to some embodiments of the present disclosure.

FIG. 2C illustrates the configuration of exemplary sensors 112c and 112d according to some embodiments of the present disclosure. Sensors 112c and 112d may be the same as sensor 112 of FIG. 1. In some embodiments, each of sensors 112a and 112b may use the same mechanism for generating sensor signals as illustrated in FIG. 2B.

As shown in FIG. 2C, sensors 112c and 112d may be positioned differently. The sensor 112c may be positioned closer to the keyboard than the sensor 112d. Thus, signals obtained by two sensors may have different baseline values. In some embodiments, the different baseline values may be set between the white keys and the black keys. Thus, the musical system 100 may distinguish the white and the black keys. In some embodiments, the different baseline values may be used to distinguish several groups of keys. Merely by way of example, the baseline value of a combination of keys may be different if the combination of keys is designed to perform certain system functions.

In a preferred embodiment, as shown in FIG. 2C, sensors 112c and 112d may be installed on a test lever 264a. The test lever 264a may also be equipped with a LED array 261. The LED array 261 may be used to indicate the key to be depressed. In some embodiments, a player may then depress the corresponding key. In some embodiments, the LED may be double-colored. The double-colored LED array 261 may be served as key indicators. The double-colored LED array 261 may be configured to distinguish black keys and white keys.

Figure 2D:
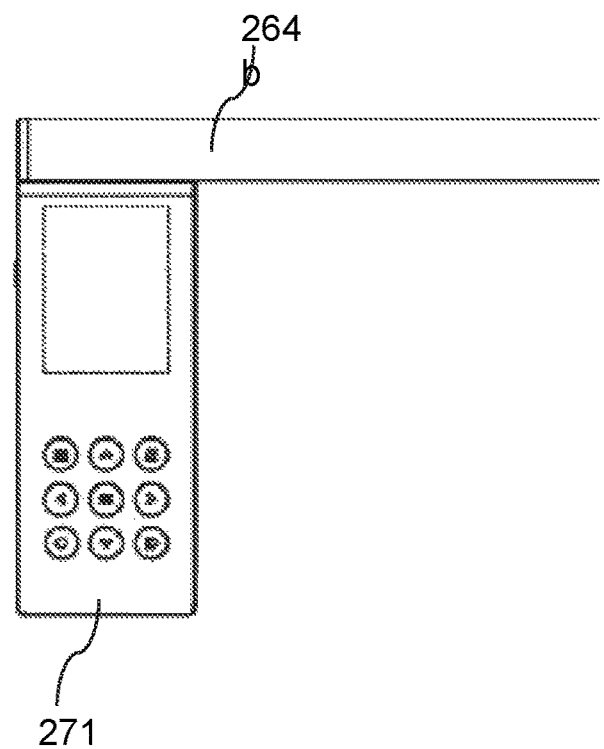
FIG. 2D illustrates configuration of an exemplary test lever and an exemplary interface according to some embodiments of the present disclosure.

FIG. 2D illustrates a configuration of an exemplary test lever and an exemplary interface according to some embodiments of the present disclosure. As shown in FIG. 2D, the test lever 264b may be coupled to an interface 271. The test lever 264b may be the same as the test lever 264a of FIG. 2C. One end of the test lever 264b may be attached to the interface 271. The interface 271 may be capable of performing multiple tasks. In some embodiments, the interface 271 may acquire settings from the player. In some embodiments, the interface 271 may acquire musical data via the external input engine 140 or the storage device 130. In some embodiments, the interface 701 may display instructions generated by the controller 160.

Figure 2E:
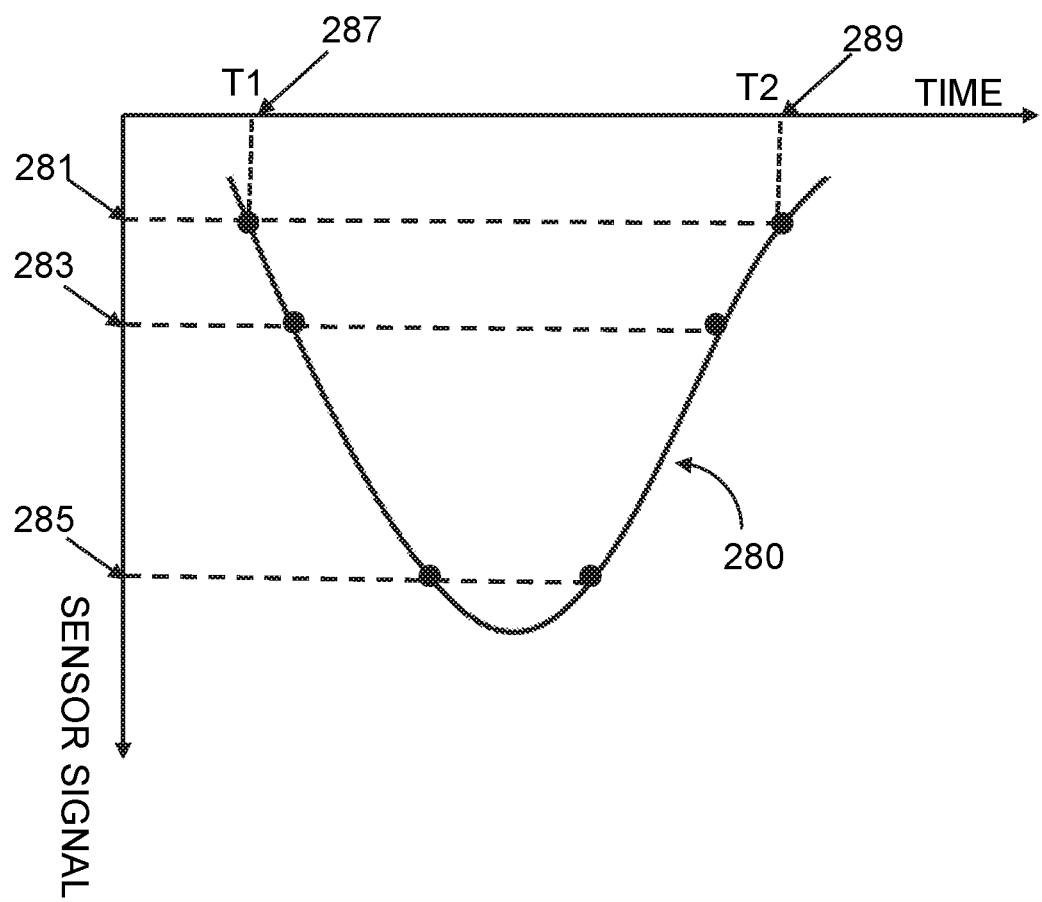
FIG. 2E illustrates an example of a sensor signal according to some embodiments of the present disclosure.

FIG. 2E illustrates an example 280 of a sensor signal according to some embodiments of the present disclosure. Sensor signal 280 can correspond to a trajectory of a key of a piano during a performance of a piece of music. Sensor signal 280 may be generated using one or more mechanisms described in conjunction with FIGS. 2A-2B above. The key may stay at a "top" position if no force is exerted on the key. When a player presses the key, the key may move downwards along with a finger of the player. When the key does not go further (e.g., when the player starts releasing the key), the key may reach an "end" position. After the player releases the key, the key moves upwards to the "top" position. As such, the trajectory of the key may represent the key's movements from the "top" position to the "end" position and/or movements from the "end" position to the "top" position.

Sensor signal 280 may represent information about the motion of the key in the trajectory. For example, a value of the sensor signal (e.g., an amplitude of the sensor signal) may correspond to a particular position of the key (e.g., the "top" position, the "end" position, a position between the "top" position and the "end" position, and/or any other position). A time instant corresponding to the value of the sensor signal may indicate a time at which the key is located at the particular position. Various values of the sensor signal may correspond to different positions of the key in the trajectory. During the movement of the key from the "top" position to the "end" position, the values of the sensor signal may increase. Similarly, during the movement of the key from the "end" position to the "top" position, the values of the sensor signal may decrease.

In some embodiments, one or more reference values may be used to determine positions of the key during a performance. For example, as illustrated in FIG. 2E, reference values 281, 283, and 285 can correspond to a first position, a second position, and a third position of the key, respectively. In some embodiments, the first position may correspond to the "top" position. The third position may correspond to the "end" position. The second position may correspond to a position between the "top" position and the "end" position. Timing information related to the reference values 281, 283, and 285 (e.g., time instants 287 and 289 corresponding to reference value 281) may be used to determine motion information related to the key. For example, time instant 287 may correspond to depression of the key. Time instant 289 may correspond to the release of the key. A time interval between time instant 287 and time instant 289 may represent a note duration produced by the key. In some embodiments, when a value of the sensor signal is greater than or equal to reference value 281, the key may be regarded as having been depressed. The reference values 281, 283, and 285 can be determined based on user input, empirical results, and/or any other information.

While three reference values are illustrated in FIG. 2E, this is merely illustrative. Any suitable number of reference values can be used to determine motion information of the key. For example, four reference numbers corresponding to four positions may be used in some embodiments.

Figure 2F:
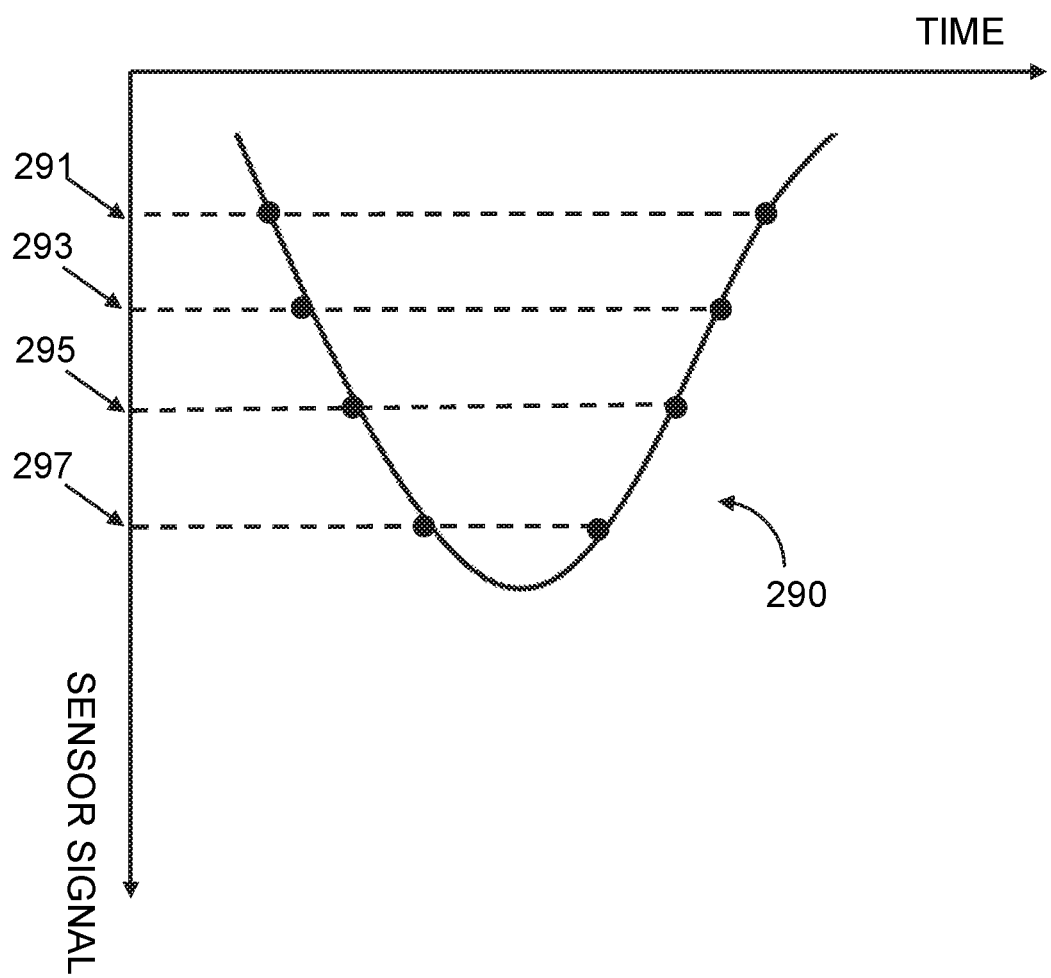
FIG. 2F illustrates another example of a sensor signal according to some embodiments of the present disclosure.

FIG. 2F illustrates another example 290 of a sensor signal according to some embodiments of the present disclosure. Sensor signal 290 can correspond to a trajectory of a key of a piano during a performance of a piece of music. Sensor signal 290 may be generated using one or more mechanisms described in conjunction with FIGS. 2A-2B above.

In some embodiments, the musical system 100 may set four thresholds in the whole trajectory. For example, as illustrated in FIG. 2F, threshold 291, 293, 295, and 297 may correspond to a first threshold, a second threshold, a third threshold, and a fourth threshold of the key, respectively. In some embodiments, the first threshold may be named "TOP_UP." The second threshold may be named "TOP." The third threshold may be named "MID." The fourth threshold may be named "TAIL." The four thresholds substantially divide the whole trajectory into five sections. These sections may or may not be evenly distributed along the axis corresponding to the sensor signal 290.

Figure 3:
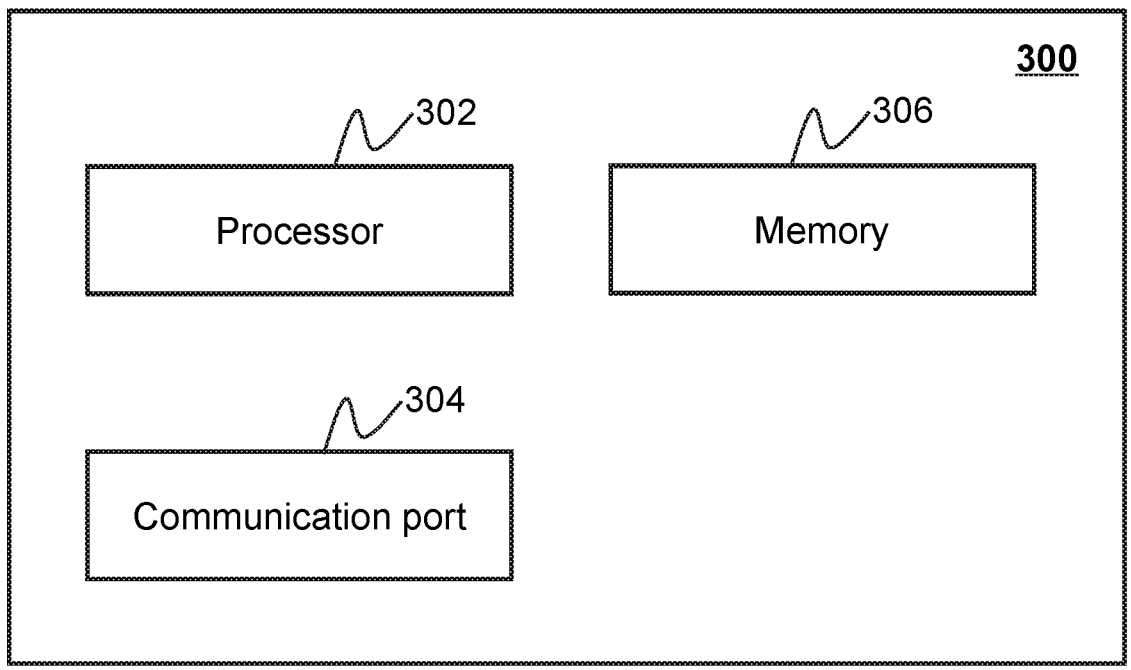
FIG. 3 is a schematic diagram illustrating exemplary hardware and software components of an exemplary computing device according to some embodiments of the present disclosure.

FIG. 3 is a schematic diagram illustrating exemplary hardware and software components of a computing device 300 on which the processing device 114, the controller 115 or the server 130 may be implemented according to some embodiments of the present disclosure. Merely by way of example, the processing device 114 may be implemented on the computing device 300 and configured to perform functions of the processing device 114 disclosed in this disclosure.

As illustrated in FIG. 3, the computing device 300 may include a processor 302, a communication port 304, and memory 306. The processor 302 may execute computer instructions (e.g., program code) and perform functions using techniques described herein. Computer instructions may include routines, programs, objects, components, data structures, procedures, modules, and functions, which perform particular functions described herein. The processor 302 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), or any circuit or processor capable of executing one or more functions, or the like, or any combinations thereof.

The communication port 304 may be configured to transmit to and receive information or data from the sensor 112, the actuator 113, the controller, or the server 130 via the network 120. In some embodiments, the communication port 304 may be a wired port (e.g., a Universal Serial Bus (USB) port, a High Definition Multimedia Interface (HDMI) port, or the like) or a wireless port (a Bluetooth™ interface, an infrared interface, a Wi-Fi port, or the like).

The memory 306 may be configured to store one or more computer programs to be executed by the processor 302 to perform exemplary methods described in this disclosure. For example, the memory 306 may be configured to store program(s) and/or instruction(s) executed by the processor 302 to analyze music data, or perform a calibration. In some embodiments, the memory 306 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc.

In some embodiments, the computing device 300 may further include an input/output device. The input device may include a computer keyboard, a piano keyboard, a touch-sensitive screen, a mouse, a trackball, a cursor direction key, a remote controller, or the like, or a combination thereof. The output device may include a display device, a loudspeaker, a printer, a projector, or the like, or a combination thereof. Exemplary display device may include a liquid crystal display (LCD), a light-emitting diode (LED)-based display, a flat panel display or curved screen, a television device, a cathode ray tube (CRT), the like, or a combination thereof. In some embodiments, one or more of the display devices may be three-dimensional capable. In some embodiments, input/output form may include text, picture, audio (e.g., a voice command input), video, or the like, or a combination thereof. In some embodiments, the input device may include a user interface. The user interface may include one or more screens for indicating functions that the user may choose to perform.

Figure 4:
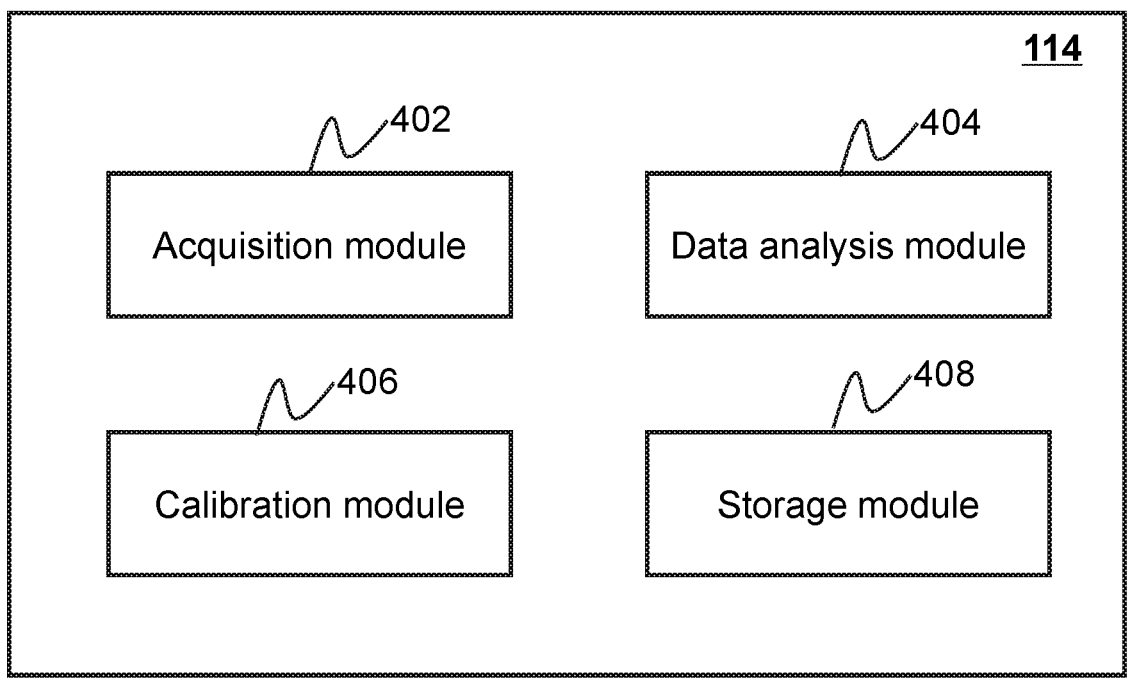
FIG. 4 is a block diagram illustrating an exemplary processing device according to some embodiments of the present disclosure.

FIG. 4 is block diagram illustrating an exemplary processing device 114 according to some embodiments of the present disclosure. In some embodiments, the processing device 114 may include an acquisition module 402, a data analysis module 404, a calibration module 406, and a storage module 408.

The acquisition module 402 may be configured to obtain music data from the sensor 112, the actuator 113, or the controller 115. The acquisition module 402 may be implemented via the communication port 304. The music data may include motion information of a key or a pedal detected by the sensor 112, a sensor signal corresponding to the motion information, a musical instruction (e.g., a musical score), a control signal generated by the controller 115, a driving signal used to drive the actuator 113, or the like, or a combination thereof. The motion information may include a sequence of keys/pedals that may be pressed according to a musical score, a motion state of a key or a pedal (e.g., a position of the key/pedal, a velocity of the key/pedal, an acceleration of the key/pedal, or the like), timing information relating to the motion state of the key/pedal (e.g., a time spot corresponding to the motion state of the key/pedal), or the like, or a combination thereof. In some embodiments, the music data may be transmitted to the data analysis module 404, the calibration module 406, or the storage module 408 to be further processed.

The data analysis module 404 may be configured to analyze the music data. The data analysis module 404 may be implemented via the processor 302. For example, the data analysis module 404 may analyze the musical instruction, and generate a parameter corresponding to the musical instruction. The parameter may include an intensity level of a force applied to a key or a pedal by the actuator 113, the number of the forces applied to the key or the pedal by the actuator 113, or the like, or a combination thereof.

The calibration module 406 may be configured to calibrate the musical system 100. The calibration module 406 may be implemented via the processor 302 and/or any other component of one or more computing devices. In some embodiments, the calibration module 404 may calibrate the musical system 100 by determining one or more relationships among the intensity levels, the MIDI levels, and the sensor signals. The one or more relationships may be represented using one or more lookup tables, functions, coordinate graphs, and/or any other data structure that can be used to map an intensity level to one or more MIDI levels and/or sensor signals.

For example, the calibration module 406 may determine one or more intensity levels and their corresponding MIDI levels and/or sensor signals. The calibration module 406 can associate the intensity levels and the MIDI levels and/or sensor signals. In some embodiments, the calibration module 406 may generate one or more lookup tables and/or any other data structure to store the associations. Alternatively or additionally, the calibration module 406 can update one or more lookup tables including predetermined mapping information related to the intensity levels, the MIDI levels, and the sensor signals based on the determined values.

In some embodiments, a component of the musical system (e.g., a key, a pedal, etc.) may be calibrated individually. One or more lookup tables may be generated for the component. In some embodiments, multiple components of the musical system 100 (e.g., multiple keys, pedals, etc.) may be calibrated in parallel, sequentially, and/or in any other order. In some embodiments, each of the components can be calibrated by executing one or more processes 500-800 of FIGS. 5-8 and/or one or more portions of these processes.

The storage module 408 may be configured to store music data, the lookup table(s), or any other data or information relating to the processing device 114. The storage module 408 may be implemented via the memory 306. In some embodiments, the storage module 130 may include a hard disk drive, a solid-state drive, a removable storage drive (e.g., a flash memory disk drive, an optical disk drive, etc.), a digital video recorder, or the like, or a combination thereof.

In some embodiments, the processing device 140 may further include a display module (not shown in FIG. 4). The display module may be configured to display the music data or the lookup table(s). Merely by way of example, the display module may display performance information relating to a performance of one or more keys, the musical instruction, or the like, or a combination thereof. In some embodiments, the display module may display a virtual keyboard on a screen. The virtual keyboard may include multiple virtual keys corresponding to actual keys of the musical component 111. In some embodiments, the number of the virtual keys and the number of the actual keys may be the same. In some embodiments, an operation on the virtual key may be synchronously performed on the corresponding actual key. In some embodiments, an instruction (e.g., timing information relating to pressing and/or releasing an actual key, a strength of a force to be applied to an actual key, a note duration, a note value, etc.) relating to one or more operations to be performed on an actual key may be displayed on a corresponding virtual key. In some embodiments, various types of information may be displayed in various portions of the screen.

Figure 5:
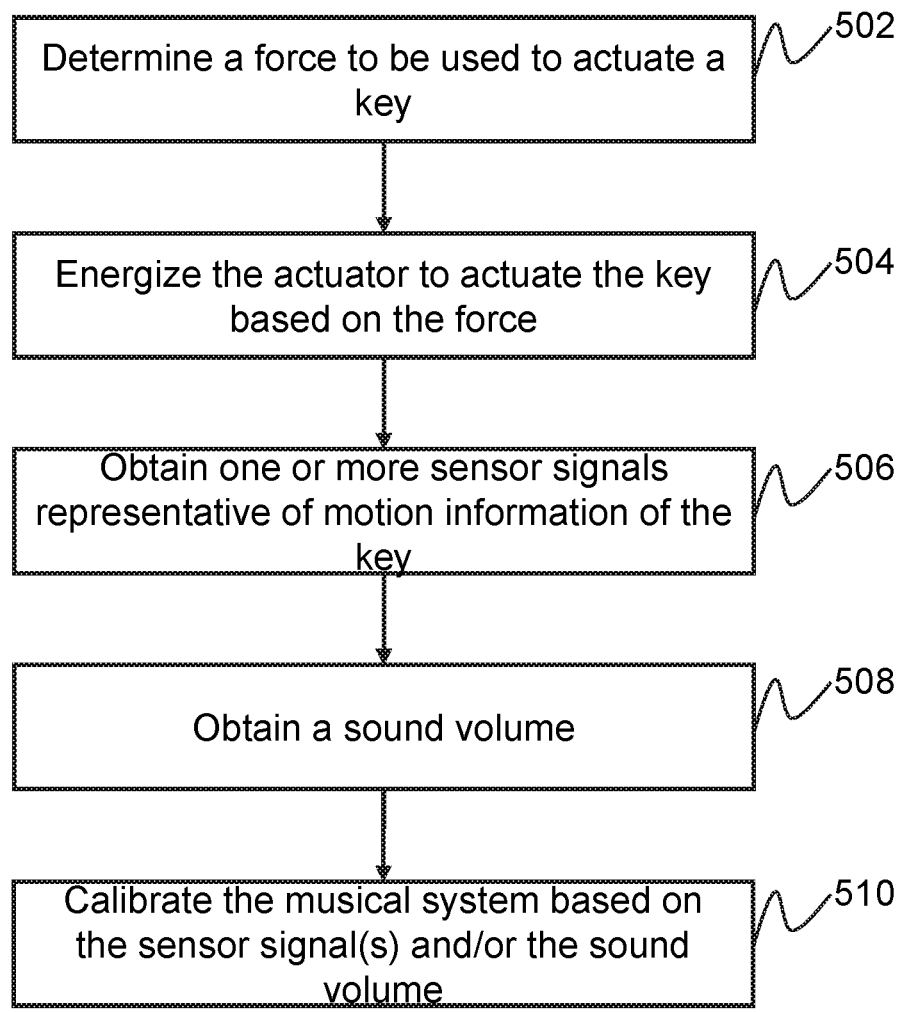
FIG. 5 is a flowchart illustrating an exemplary process for calibrating a musical system according to some embodiments of the present disclosure.

FIG. 5 is a flowchart illustrating an exemplary process 500 for calibrating a musical system according to some embodiments of the present disclosure. Process 500 may be performed by one or more computing devices implementing the calibration module 406. In some embodiments, the calibration module 406 may determine whether to perform a calibration based on any suitable criterion and/or criteria. For example, the calibration module 406 may determine that a calibration is to be performed in response to determining that the time interval between a time instant corresponding to a previous calibration (e.g., the most recent calibration) and a current time exceeds a certain threshold (e.g., one month). As another example, the calibration module 406 may determine that a calibration is to be performed in response to determining that the piano has been played for a certain number of times (e.g., 50 times). As a further example, the calibration module 406 may perform a calibration according to an instruction from a user. In some embodiments, one or more portions of process 500 may be executed to calibrate a key of a piano.

As illustrated in FIG. 5, in step 502, the calibration module 406 may determine a force to be used to actuate a key. For example, the calibration module 406 may determine a force corresponding to a given intensity level. As another example, the calibration module 406 may determine forces corresponding to multiple intensity levels, such as a minimum intensity level, a maximum intensity level, or any other intensity level. The minimum intensity level may refer to a lower limit of the intensity levels. In some embodiments, the minimum intensity level may correspond to an amount of force that is required to move a component of the musical system (e.g., pressing a key). The maximum intensity level may refer to an upper limit of multiple intensity levels. For example, intensity level 0 and intensity level n may be regarded as being the minimum intensity level and the maximum intensity level, respectively, in intensity level 0, intensity level 1, . . . , and intensity level n, where n is a positive integer. The upper limit of the intensity level may be determined by the musical system 100, or may be adjusted by a user. In some embodiments, the force may be determined according to a default setting of the musical system 100, one or more inputs provided by a user, and/or any other information.

In step 504, the calibration module 406 may energize the actuator 113 to actuate the key based on the force. In some embodiments, the actuator 113 may actuate the key by applying forces corresponding to multiple intensity levels. The forces may be applied in a predefined order. For example, the predefined order may be an ascending order, a descending order, a random order, etc.

In step 506, the calibration module 406 may obtain one or more sensor signals representative of motion information of the key. The sensor signal may be acquired by one or more sensors configured to detect motion information and/or any other information about the key (e.g., one or more sensors 112 of FIG. 1). The sensor signal may include any information about motions of the key in response to application of the force. For example, the sensor signal may include positional information of the key (e.g., one or more positions) and corresponding timing information (e.g., time instants, durations, etc. corresponding to the positions). As another example, the sensor signal may include information related to whether the key has reached a particular position (e.g., whether the key has been pressed). In some embodiments, the calibration module 406 may obtain multiple sensor signals corresponding to multiple intensity levels of forces applied to the key.

In some embodiments, in step 508, the calibration module 406 may obtain a sound volume. The sound volume may be acquired by a volume analyzer that is configured to acquire volume information about the key. In some embodiments, the calibration module 406 may obtain multiple sound volumes corresponding to multiple intensity levels.

In step 510, the calibration module 406 may calibrate the musical system based on the sensor signal(s) and/or the sound volume. For example, the calibration module 406 can associate the intensity level with the sensor signal(s) and/or the sound volume. As another example, the calibration module 406 can associate the intensity level with one or more MIDI levels. More particularly, for example, information related to the intensity level can be stored in association with one or more portions of the sensor signal(s), the sound volume, and/or the MIDI levels using any suitable data structure. The information related to the intensity level may include, for example, the intensity level (e.g., level 1, level 2, etc.), an amount of force corresponding to the intensity level (5 newtons, 10 newtons, etc.), etc. The data structure can include one or more tables, diagrams, and/or any other data structure that can be used to map the intensity level to the sensor signal(s), the sound volume, and/or the MIDI level(s).

In some embodiments, the calibration module 406 can calibrate the musical system by updating known mapping information related to intensity levels, MIDI levels, sound volumes, and/or sensor signals based on the acquired sensor signal, the sound volume, etc. For example, the calibration module 406 may update a lookup table including the mapping information. The lookup table may be a table including a relationship between various parameters and MIDI levels. In some embodiments, the lookup table may include an object-relational mapping, a one-to-one match relationship, a functional relationship (linear or non-linear), or the like, or a combination thereof. For example, the lookup table may be and/or include a first lookup table (e.g., table 1 as illustrated below) including a relationship between various intensity levels of the force applied to the key and MIDI levels. As another example, the lookup table may be and/or include a second lookup table (e.g., table 2 as illustrated below) including a relationship between various sensor signals acquired by the sensor 112 and intensity levels of the force applied to the key. As still another example, the lookup table may be and/or include a third lookup table (e.g., table 3 as illustrated below) including a relationship between various sound volumes acquired the volume analyzer and intensity levels of the force applied to the key. In some embodiments, the musical system 100 may store the lookup table(s) in any storage disclosed elsewhere in the present disclosure.

In some embodiments, the MIDI levels may include a certain number of levels (e.g., 128 levels including level 0, level 1, . . . , and level 127). The intensity levels of forces applied to the key or pedal may include intensity level 0, intensity level 1, . . . , intensity level 127 accordingly. In some embodiments, the intensity levels of a force applied to a key or a pedal may be represented by a drive signal (e.g., an excitation signal) that can drive the actuator 113. The drive signal may be expressed as $D_i$. Correspondingly the intensity levels may be represented by $\{D_0, D_1, \ldots, D_{127}\}$. In some embodiments, the sensor signals acquired by the sensor 112 and the sound volumes acquired by the volume analyzer may be expressed as $\{S_0, S_1, \ldots, S_{127}\}$ and $\{V_0, V_1, \ldots, V_{127}\}$ respectively.

In some embodiments, in the first lookup table, the intensity levels may correspond to the MIDI levels respectively. For example, as illustrated in Table 1, each of intensity levels 0-127 corresponds to one of MIDI levels 0-127.

Table 1 an Example of Relationships Between Intensity Levels and Midi Levels

| Intensity level | Value of the intensity level | MIDI level |
|---|---|---|
| Intensity level 0 | 1N | Level 0 |
| Intensity level 1 | 5N | Level 1 |
| . . . | . . . | . . . |
| Intensity level 127 | 70N | Level 127 |

As used herein, unit "N" in Table 1 refers to Newton (also referred to as $kg \cdot m/s^2$).

Table 2 an Example of Relationships Between Intensity Levels and Sensor Signals

| Intensity level | Value of the intensity level | Sensor signal |
|---|---|---|
| Intensity level 0 | 5N | $S_0$ |
| Intensity level 1 | 5.4N | $S_1$ |
| . . . | . . . | . . . |
| Intensity level 127 | 60N | $S_{127}$ |

As used herein, unit "N" in Table 2 refers to Newton (also referred to as $kg \cdot m/s^2$).

In some embodiments, for the first lookup table, the calibration module 406 may analyze and/or process the intensity levels of the force applied to the key, and update the relationship between the intensity levels and the MIDI levels. For example, the calibration module 406 may determine a first intensity level (e.g., a minimum intensity level) and a second intensity level (e.g., a maximum intensity level), a difference between the first intensity level and the second intensity level, and the remaining 126 intensity levels based on the difference.

In some embodiments, for the second lookup table, the calibration module 406 may compare the sensor signals acquired by the sensor 112 with original sensor signals (also referred to as "reference sensor signals") in the second lookup table, and update the second lookup table based on the comparison.

Table 3 an Example of Relationships Between Intensity Levels and Sound Volumes

| Intensity level | Value of the intensity level | Sound volume |
|---|---|---|
| Intensity level 0 | 5N | $V_0$ |
| Intensity level 1 | 5.4N | $V_1$ |
| ... | ... | ... |
| Intensity level 127 | 60N | $V_{127}$ |

As used herein, unit "N" in Table 2 refers to Newton (also referred to as kg·m/s$^2$).

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, process 500 may include one or more other optional steps, for example, a caching step, a storing step, or the like. In some embodiments, process 500 can be executed iteratively to calibrate the musical system (e.g., to apply multiple forces, to calibrate multiple keys of the musical system, etc.).

Figure 6:
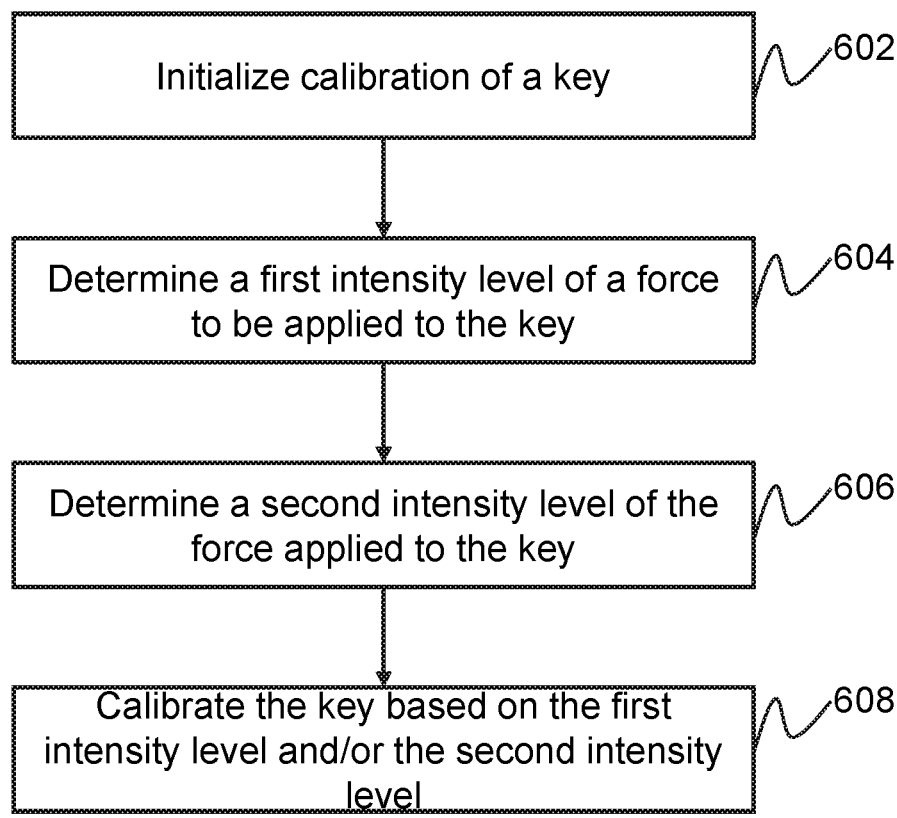
FIG. 6 is a flowchart illustrating an exemplary process for calibrating a musical system according to some embodiments of the present disclosure.

FIG. 6 is a flowchart illustrating an exemplary method 600 for calibrating a musical system according to some embodiments of the present disclosure. Process 600 may be performed by one or more computing devices implementing the calibration module 406. In some embodiments, one or more portions of process 600 may be executed to calibrate a component of the musical system, such as a key of a piano.

In step 602, the calibration module 406 may initialize calibration of a key. For example, the calibration module 406 may reset the key to a default position. In some embodiments, the default position may be a position of the key when no force is applied to the key (e.g., when the key is not depressed). In some embodiments, the calibration module 406 may initialize the key by providing a functional button (e.g., a button providing instant recovery options) and receiving a request for calibration via the functional button.

In step 604, the calibration module 406 may determine a first intensity level of force to be applied to the key. The first intensity level may be a minimum intensity level representative of a lower limit of multiple intensity levels. For example, the minimum intensity level may be "intensity level 0" as shown in Table 1.

In some embodiments, the calibration module 406 may determine the first intensity level using a dichotomy method. For example, the first intensity level may be determined by executing one or more portions of process 700 as described in connection with FIG. Seven below. In some embodiments, the calibration module 406 may determine the first intensity level by a trial method. For example, the calibration module 406 may energize an actuator to actuate the key by forces corresponding to different intensity levels. The calibration module 406 can determine whether the key is pressed when each of the forces is applied to the key. The calibration module 406 can then determine a minimum intensity level by identifying a force that is required to move the key downward (e.g., the minimum force, the second minimum force, and/or any other force that can be used to press the key). In some embodiments, the forces can be applied to the key in a predefined order (e.g., an ascending order, a descending order, a random order, etc.).

In step 606, the calibration module 406 may determine a second intensity level of the force applied to the key. The second intensity level may be a maximum intensity level representative of an upper limit of multiple intensity levels. The maximum intensity level may be defined as "intensity level 127". In some embodiments, the calibration module 406 may determine the second intensity level according to default settings of the musical system 100. In some embodiments, the calibration module 406 may determine the second intensity level based on an instruction from a user (e.g., a value inputted by the user). In some embodiments, the calibration module 406 may determine the second intensity level according to the time duration that the actuator 113 has been used. For example, if the actuator 113 has been used for a particular period of time (e.g., one years), the calibration module 406 may assign a particular value to the second intensity level. In some embodiments, the particular value may be a value that is not greater than a threshold. The threshold may a default value set by the musical system 100. Alternatively or additionally, the threshold may be adjusted in different conditions. In some embodiments, a smaller value can be assigned to the threshold for a longer period of time during which the actuator is not used.

In step 608, the calibration module 406 may calibrate the key based on the first intensity level and/or the second intensity level. For example, the calibration module 406 can determine values of one or more other intensity levels based on the values of the first intensity level and/or the second intensity level. The calibration module 406 can also update a first relationship between various intensity levels of forces applied to the key and MIDI levels based on the first intensity level and the second intensity level. Merely by way of example, the first relationship may be expressed as a first lookup table. Before calibration, in the first lookup table (also referred to as an "original first lookup table"), the intensity levels of the force (hereafter referred to as "original intensity levels") applied to the key may correspond to the MIDI levels respectively.

In some embodiments, one or more values of the other intensity levels may be determined by estimating one or more values based on the values of the first intensity level and the second intensity level. The estimation may be made using one or more interpolation methods, such as one or more of a linear interpolation method, polynomial interpolation method, a spline interpolation method, etc.

For example, the calibration module 406 may determine a difference between the value of the first intensity level and the value of the second intensity level. The calibration module 406 can then determine values of one or more other intensity levels (e.g., a third intensity level, a fourth intensity level, etc.) based on the difference and update the first lookup table based on the determined values. For example, the calibration module 406 can divide the difference by a particular number (e.g., one, two, three, etc.) to generate a step value. In some embodiments, the particular number can be determined based on the number of the other intensity levels. For example, the particular number may be the same as the number of the other intensity levels. The values of the one or more other intensity levels may be estimated based on the step value. For example, a value of a third intensity level may be determined by determining a combination of the value of the first intensity level and the step value. More particularly, for example, the value of the third intensity level may be a sum of the value of the first intensity level and the step value, a weighted sum of the value of the first intensity level and the step value, a weighted average of the value of the first intensity level and the step value, and/or any other suitable combination of the value of the first intensity level and the step value.

As a more particular example, the values of the first intensity level (e.g., intensity level 0 as illustrated in Table 1) and the second intensity level (e.g., intensity level 127 as illustrated in Table 1) may be 5 N and 60 N, respectively. The calibration module 406 may determine that the difference between the value of the first intensity level and the value of the second intensity level is 55 N. The calibration module 406 may divide the difference (55 N) by a particular number, such as 127, to generate a step value. The step value may be 55/127 N. A value of another intensity level (e.g., intensity level 1, intensity level 2, . . . , intensity level 126) may be a combination of the value of intensity level 0 and the step value, such as (5+55/127) N, (5+110/127) N, etc. The calibration module 406 may update the first lookup table (e.g., table 1) using the determined values of the intensity levels accordingly.

In some embodiments, the first intensity levels or second intensity levels of different keys may be different. The calibration module 406 may calibrate the first lookup tables for different keys accordingly.

It should be noted that the above description is merely provided for illustration, and not intended to limit the scope of the present disclosure. For persons having ordinary skills in the art, multiple variations and modifications may be made under the teachings of the present disclosure.

Figure 7:
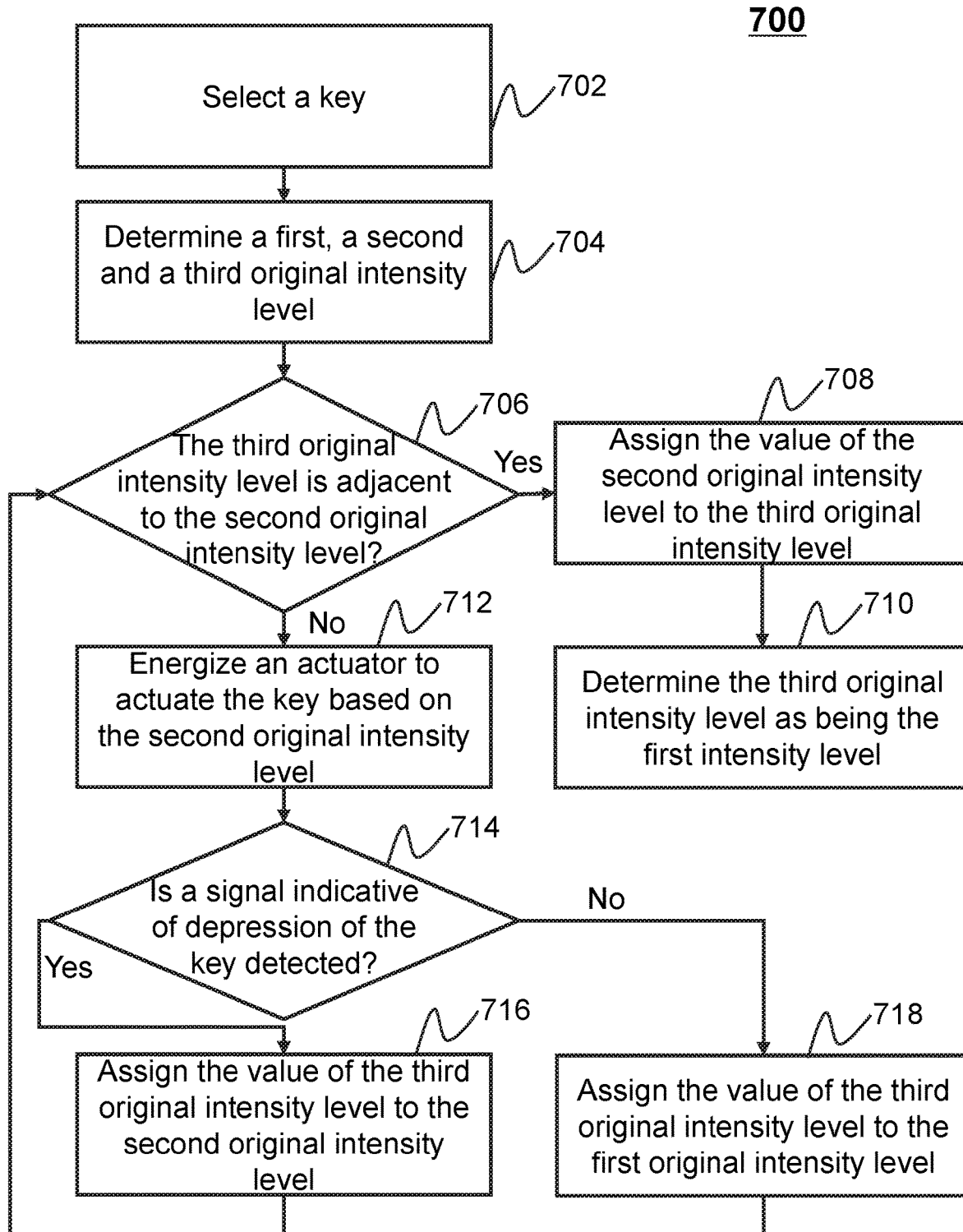
FIG. 7 is a flowchart illustrating an exemplary process for determining a minimum intensity level of a key according to some embodiments of the present disclosure.

FIG. 7 is a flowchart illustrating an exemplary method 700 for determining a first intensity level of a key according to some embodiments of the present disclosure. The first intensity level may be a minimum intensity level representative of a lower limit of multiple intensity levels. Process 700 may be performed by one or more computing devices implementing the calibration module 406. In some embodiments, one or more portions of process 700 may be executed to calibrate a key of a piano.

In step 702, the calibration module 406 may select a key. The selection can be made in any suitable manner. For example, the key may be selected based on a user input (e.g., a user selection of the key). As another example, the calibration module 406 may select the key randomly. As still another example, the calibration module 406 may select the key based on the position of the key in the piano (e.g., the leftmost key, the rightmost key, etc.).

In step 704, the calibration module 406 may determine one or more original intensity levels. For example, the calibration module 406 can determine one or more original intensity levels based on an original minimum intensity level and/or an original maximum intensity level. More particularly, for example, the calibration module 406 can determine a first original intensity level and a second original intensity level based on the original minimum intensity level and the original maximum intensity level, respectively. As another example, the calibration module 406 can determine a third original intensity level based on the first original intensity level and/or the second intensity level. In some embodiments, the third original intensity level may be an intensity level between the first original intensity level and the second original intensity level. More particularly, for example, the third original intensity level can be determined based on a midpoint of an interval defined by the first original intensity level and the second original intensity level. In some embodiments, the first original intensity level, the second original intensity level, and the third original intensity level can be represented as level j, level k, and level i, respectively. The values of j, k, and i may be any suitable integer. For example, the values of j, k, and i may be 0, n, and (1+n)/2, respectively, where n is an integer (e.g., n=127). In some embodiments, the calibration module 406 may determine the original intensity levels according to the first lookup table (e.g. table 1).

In step 706, the calibration module 406 may determine whether the third original intensity level is adjacent to the second original intensity level. For example, the calibration module 406 can determine that the third original intensity level is adjacent to the second original intensity level in response to determining that j equals k minus 1.

In some embodiments, in response to determining that the second original intensity level is adjacent to the third original intensity level, the calibration module 406 may proceed to step 708 and may assign the value of the second original intensity level (e.g., the value of k) to the third original intensity level (e.g., the value of i).

In step 710, the calibration module 406 may determine the third original intensity level (e.g., the value of i) as being the first intensity level.

In some embodiments, in response to determining that the second original intensity level is not adjacent to the third original intensity level (e.g., "NO" at step 706), the calibration module 406 can proceed to step 712 and can energize an actuator to actuate the key based on the second intensity level (e.g., level k).

In step 714, the calibration module 406 may determine whether a signal indicative of depression of the key is detected. For example, the calibration module 406 can determine whether sensor data (e.g., a sensor signal) has been generated by a sensor configured to detect motion information about the key. More particularly, for example, the calibration module 406 can determine that a signal indicative of depression of the key is detected in response to receiving sensor data from the sensor. As another example, the calibration module 406 can make the determination based on a sensor signal representing the motion of the key. More particularly, for example, the calibration module 406 can determine that the key has been depressed in response to determining that a value of the sensor signal is greater than a threshold (e.g., a reference value corresponding to a position of the key).

In some embodiments, in response to receiving the signal (e.g., "YES" at step 714), the calibration module 406 may proceed to step 716 and may assign the value of the third original intensity level (e.g., the value of i) to the second original intensity level (e.g., level k). Alternatively, in response to determining that the signal is not detected, the calibration module 406 may proceed to step 718 and may assign the value of the third original intensity level (e.g., the value of i) to the first original intensity level (e.g., the value of j).

Next the method 700 may loop back to step 706 to determine whether the third original intensity level is adjacent to the second original intensity level, until the third original intensity level is adjacent to the second original intensity level, the calibration module 406 may determine the third original intensity level (e.g., the value of i) as the first intensity level.

It should be noted that the above description of the process for determining a minimum intensity level of keys is merely provided for illustration, and not intended to limit the scope of the present disclosure. For persons having ordinary skills in the art, multiple variations and modifications may be made under the teachings of the present disclosure. For example, in step 714, the calibration module 406 may determine whether a volume analyzer corresponding to the key detects a sound signal. As another example, the levels i, j and k may be selected arbitrarily, where k is larger than both i and j, i is larger than j, and i, j and k are integers.

Figure 8:
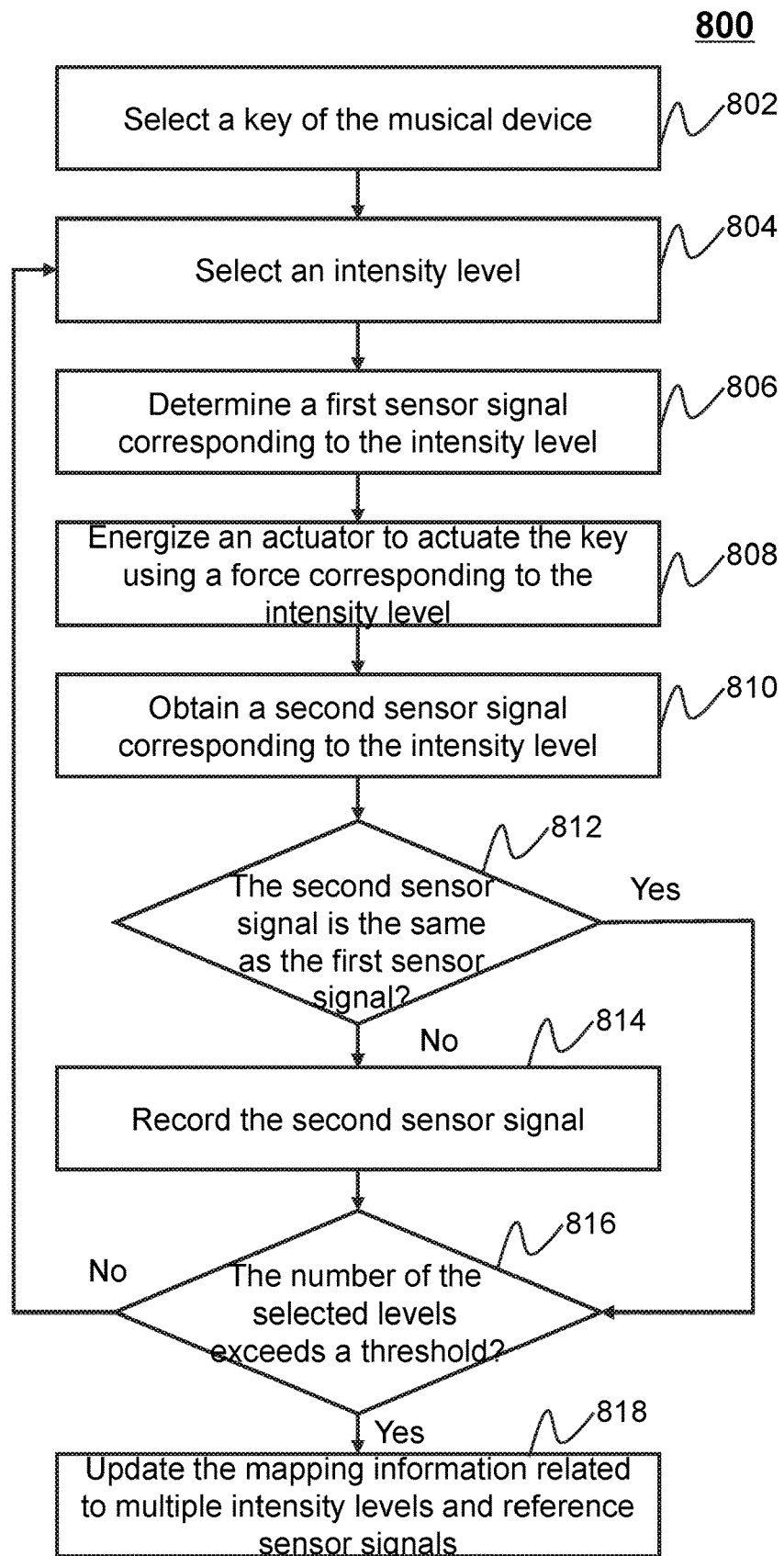
FIG. 8 is a flowchart illustrating an exemplary process for calibrating a musical system according to some embodiments of the present disclosure.

FIG. 8 is a flowchart illustrating an exemplary method 800 for calibrating a component of a musical system according to some embodiments of the present disclosure. Process 800 may be performed by one or more computing devices implementing the calibration module 406. In some embodiments, method 800 can be performed to update a relationship between intensity levels and their corresponding sensor signals for the component of the musical system (e.g., a key, a pedal, etc.).

In step 802, the calibration module 406 may select a key of the musical device. In some embodiments, the key may be selected by a user. In some embodiments, the calibration module 406 may select the key randomly.

In step 804, the calibration module 406 may select an intensity level. In some embodiments, the intensity level may be selected from multiple predetermined intensity levels (e.g., intensity levels ranging from 0 to 127 or any other suitable number). For example, the intensity level may be a minimum intensity level, a maximum intensity level, a random intensity level, or any other intensity level. In some embodiments, the calibration module 406 may select the intensity level according to an instruction from a user. In some embodiments, the intensity level may be represented as level m.

In step 806, the calibration module 406 may determine a first sensor signal corresponding to the intensity level. For example, the calibration module 407 can determine the first sensor signal based on a predetermined relationship between various intensity levels and their corresponding sensor signals (e.g., a lookup table illustrated in Table 2). The first sensor signal may be a reference signal representative of known motion information of the key when a force corresponding to the intensity level is applied to the key.

In step 808, the calibration module 406 may energize an actuator to actuate the key using a force corresponding to the intensity level. For example, the actuator 113 may actuate the key based on a force with the level m.

In step 810, the calibration module 406 may obtain a second sensor signal corresponding to the intensity level. For example, the second sensor signal can be obtained via one or more sensors that are configured to detect motion information of the key (e.g., one or more sensors 112 of FIG. 1). More particularly, for example, while the actuator actuates the key, the sensor(s) may detect motions of the key and may generate the second sensor signal accordingly.

In step 812, the calibration module 406 may determine whether the second sensor signal is the same as the first sensor signal. For example, the calibration module 406 can compare the second sensor signal and the first sensor signal and determine a difference between the second sensor signal and the first sensor signal. In some embodiments, the calibration module 406 can determine that the second sensor signal is the same as the first sensor signal when the difference is not greater than a threshold. The calibration module 406 can determine that the second sensor signal is not the same as the first sensor signal when the difference is greater than the threshold.

In some embodiments, in response to determining that the second sensor signal is the same as the first sensor signal (e.g., "Yes" at step 812), the calibration module 406 may proceed to step 816 and may determine whether the number of the selected levels exceeds a threshold.

In some embodiments, in response to determining that the second sensor signal is not the same as the first sensor signal (e.g., "No" at step 812), the calibration module 406 may proceed to step 814 and may record the second sensor signal.

In step 816, the calibration module 406 may determine whether the number of the selected levels exceeds a threshold. The threshold can have any suitable value (e.g., 3, 5, 10, etc.). The threshold may be a default value set by the musical system 100 or may be set by a user.

In some embodiments, in response to determining that the number of the selected levels exceeds the threshold (e.g., "Yes" at step 816), the calibration module 406 may proceed to step 818 and may update the second relationship based on the second sensor signal.

In some embodiments, in response to determining that the number of the selected levels does not exceed the threshold (e.g., "No" at step 816), the calibration module 406 may loop back to step 804 and may select an intensity level.

In step 818, the calibration module 406 may update mapping information related to multiple intensity levels and reference sensor signals based on the second sensor signal. The reference sensor signals may be known sensors signals that have been associated with the intensity levels. The reference sensor signals may include the first sensor signal. In some embodiments, the calibration module 406 may update the mapping information by updating the relationships between the various reference sensor signals and the intensity levels. For example, the calibration module 406 may update the mapping information (e.g., table 2 illustrated above) by replacing the first sensor signal(s) with the second sensor signal(s). As another example, the calibration module 406 may update the mapping information using an interpolation method based on the second sensor signal(s). The interpolation method may include a linear interpolation, a polynomial interpolation, a spline interpolation, or the like, or a combination thereof. For example, the calibration module 406 may select two intensity levels. The calibration module 406 may obtain the two recorded second sensor signals (e.g., reference sensors signals) corresponding to the two intensity levels. The calibration module 406 may determine a middle intensity level. The middle intensity level may fall in an interval defined by the two selected intensity levels. For example, the middle intensity level may be the average of the two selected intensity levels. The calibration module 406 may determine the second sensor signal corresponding to the middle intensity level based on the two recorded second sensor signals. For example, the second sensor signal corresponding to the middle intensity level may be the average of the two recorded sensor signals.

In some embodiments, in step 806, the calibration module 406 may determine a sound volume $V_m$ corresponding to the level m according to a third relationship (e.g., a third lookup table illustrated in Table 3). Accordingly, in step 810, the calibration module 406 may obtain a sound signal with a sound volume $V_d$ from the volume analyzer. Further in the next step(s), the calibration module 406 may update the third relationship based on the sound volume $V_d$.

Figure 9:
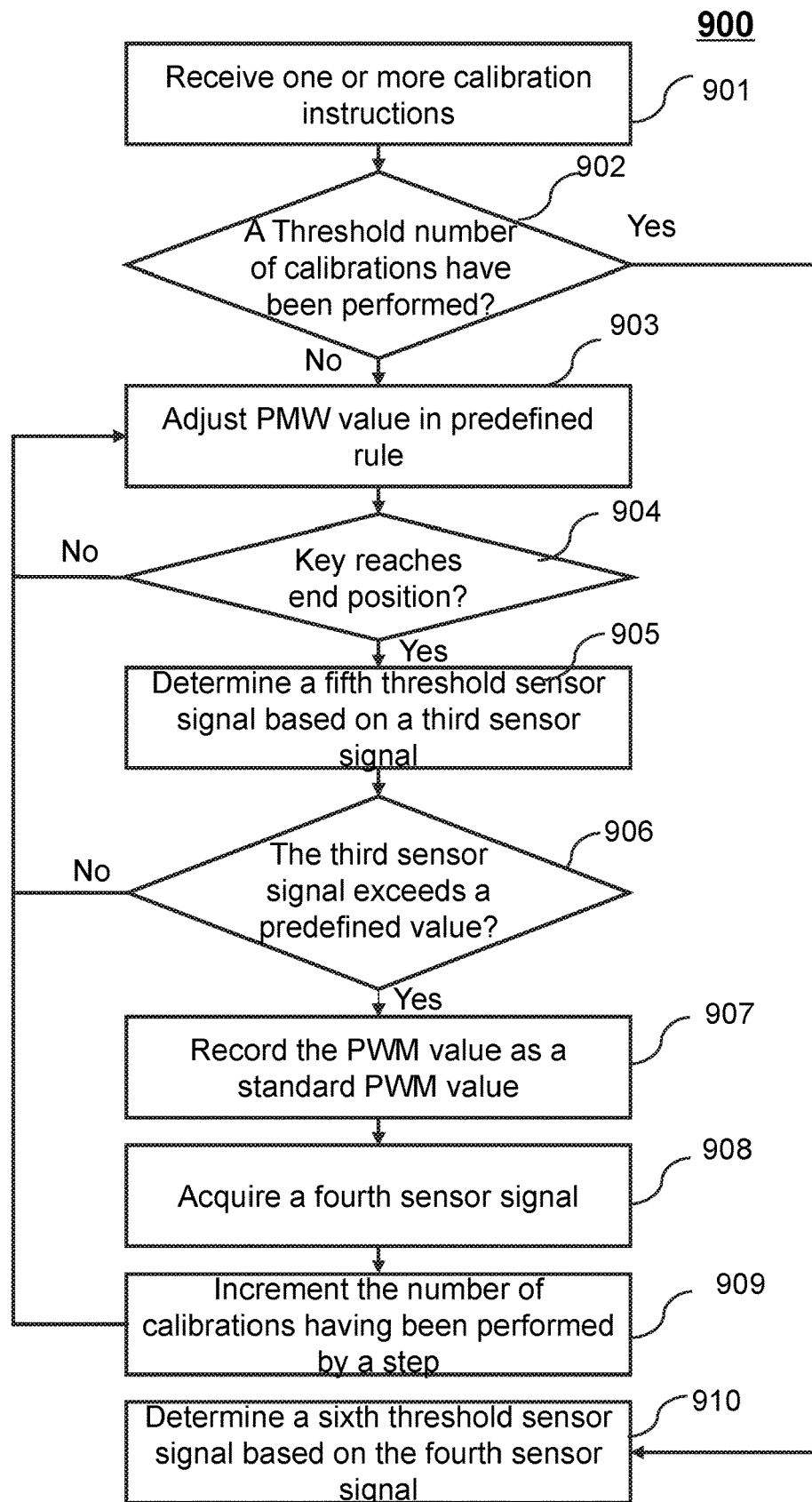
FIG. 9 is a flowchart illustrating an exemplary process for calibrating a component of a musical system according to some embodiments of the present disclosure.

FIG. 9 is a flowchart illustrating an exemplary process 900 for calibrating a component of a musical system according to some embodiments of the present disclosure. Process 900 may be performed by one or more computing devices implementing the calibration module 406.

As shown in FIG. 9, in step 901, the calibration module 406 may receive one or more calibration instructions. The calibration instruction(s) may be generated based on one or more user inputs, instructions provided by the controller 115, and/or any other information. In some embodiments, the calibration instruction(s) may include one or more instructions that indicate a user request to initiate the calibration process. The calibration instruction(s) may also include one or more instructions that indicate the conditions of the sensor 112, the processing device 114, a frequency of usage, the number of errors in one or more performances, etc.

In step 902, the calibration module 406 may determine whether a threshold number of calibrations have been performed. The threshold number of calibrations may be determined based on the number of the keys of the piano, the number of the sensors to be calibrated, the number of groups of sensors to be calibrated, the sequential order in which the sensors and/or group of sensors are calibrated, and/or any other information about the piano and/or the calibration(s) to be performed. For example, the threshold number of calibrations may be the same as the number of the keys when each of the sensors corresponds to a key and/or when each of the sensors is calibrated individually. As another example, in some embodiments in which the sensors are divided into several groups, the threshold number of calibrations may be the number of the groups. Multiple groups of sensors may be calibrated sequentially, in parallel, and/or in any other manner. In a particular example, when the piano is equipped with 88 sensors and the 88 sensors are divided into four groups, the threshold number of calibrations may be 4. In a more particular example, each of a first group, a second group, and a third group of sensors may include 24 key sensors, and a fourth group of sensors may include 16 key sensors. In an exemplary calibration process described in FIG. 9, the predetermined threshold number of calibrations may be 88, and each of the 88 sensors may be calibrated separately.

In some embodiments, the calibration module 406 may proceed to step 910 in response to determining that the threshold number of calibrations have been performed.

Alternatively, in response to determining that the threshold of calibrations have not been performed, the calibration module 406 may proceed to step 903. In step 903, the calibration module 406 may adjust one or more PWM values corresponding to a first sensor and/or a first group of sensors. For example, the PWM values may be adjusted till difference of the sensor signals between white keys and black keys reaches certain values. As the white keys and black keys may produce musical notes that are a half-step apart, the PWM values may be adjusted to distinguish the white keys and black keys. After adjusting the PWM values, the white/black key may be depressed towards the end position.

In step 904, the calibration module 406 may determine if the key reaches an "end" position. For example, the calibration module 406 may determine that the key has reached the end position in response to detecting a certain value of the sensor signal (e.g., a maximum value, a minimum value, or any other value detected during a period of time).

In some embodiments, the calibration module 406 may loop back to step 902 in response to determining that the key has not reached the "end" position.

In some embodiments, in response to determining that the key has reached the "end" position, the calibration module 406 may proceed to step 905. In step 905, the calibration module 406 may determine a fifth threshold sensor signal based on a third sensor signal. In some embodiments, the calibration module 406 may determine that the value of the fifth threshold sensor signal is equal to the value of the third sensor signal. In some embodiments, the fifth threshold sensor signal may represent a reference value that may be used to determine whether the key is at the "end" position (e.g. the reference value 285 as described in connection with FIG. 2E above). The third sensor signal may correspond to a first time instant (e.g., when the key reaches the "end" position, a time instant prior to or after the detection of the "end" position, etc.).

In step 906, the calibration module 406 can determine whether the third sensor signal exceeds a predefined value. If the third sensor signal exceeds the predefined value, the process may proceed to step 907. Alternatively, the calibration module 406 may loop back to step 902 in response to determining that the third sensor signal does not exceed the predefined value. The predefined value may be defined empirically. In some embodiments, the predefined value may be defined according to results of several tests performed on the musical system 100 before the calibration. The tests may be performed by depressing each key to the "end" position one or more times, and recording values of sensor signals. The values of sensor signals may be used as a reference to the predefined value. For instance, an average of sensor signals in one or more test may be defined as predefined value.

In step 907, the PWM value of the sensor may be recorded as a standard PWM value of this sensor. Then the key may be released from the end position.

In step 908, the calibration module 406 can acquire a fourth sensor signal. The forth may be acquired at a second time instant. The first time instant and the second time instant may constitute a predetermined time interval, such as one second, a few seconds (e.g., two seconds), and/or any other suitable period of time.

In step 909, the number of calibrations having been performed may be incremented by a step. The step may have any value, such as "1," "2," etc. The current calibration may be regarded as having been completed in step 909. The calibration module 406 may loop back to step 902 to perform a next calibration. For example, the musical system 100 may skip the calibration of one or more newly installed sensors. The musical system 100 may calibrate some sensors more than once. For instance, the musical system 100 may detect deterioration conditions of some sensors and calibrate the sensors suffering from functional deterioration more than once.

Upon completing the threshold number of calibrations (e.g., "No" at step 902), the calibration module 406 may proceed to step 910. In step 910, the calibration module 406 may define a sixth threshold sensor signal based on the fourth sensor signal. The sixth threshold sensor signal may be a reference value that can be used to determine whether the key is at the "top" position (e.g., the reference value 281 as described in connection with FIG. 2E above).

Figure 10:
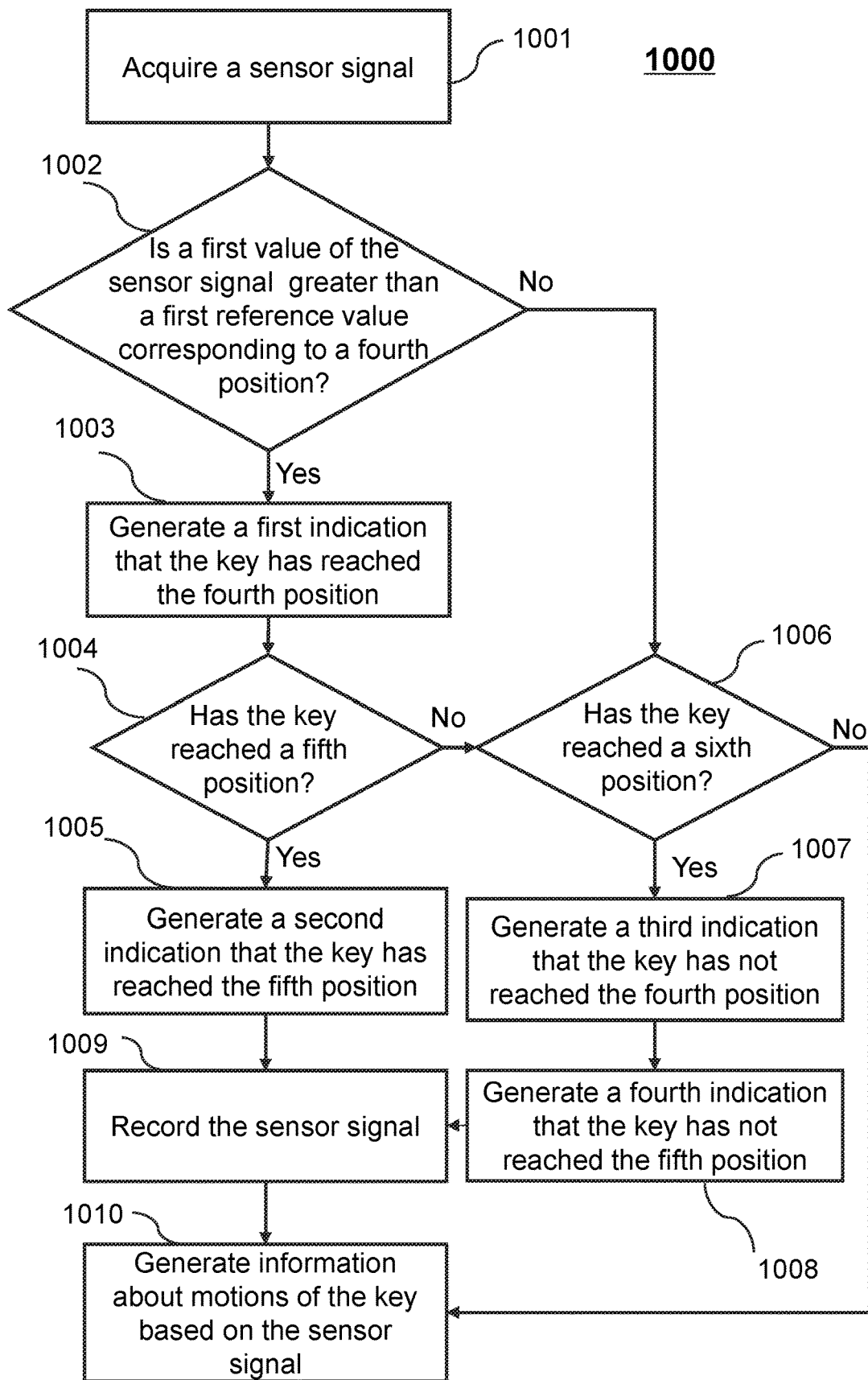
FIG. 10 is a flowchart illustrating an exemplary process for processing sensor signals representative of motions of a key according to some embodiments of the present disclosure.

FIG. 10 is a flowchart illustrating an exemplary process 1000 for processing sensor signals representative of motions of a key according to some embodiments of the present disclosure. Process 1000 may be used to acquire information about motions of the key.

Process 1000 may be performed by processing logic that comprises hardware (e.g., circuitry, dedicated logic, programmable logic, microcode, etc.), software (e.g., instructions run on a processing device to perform hardware simulation), or a combination thereof. In some implementations, process 1000 may be performed by the processing device 114.

As shown in FIG. 10, in step 1001, the processing device 114 may acquire a sensor signal in step 1001. The sensor signal may be acquired by the sensor 112. Various values of the signal may be sampled over time randomly, periodically, etc. The values may be sampled at any suitable sampling rate.

In some embodiments, the processing device 114 may also start a timer to record timing information about the sensor signal. For example, the timer may be used to track and record one or more time instants corresponding to one or more values of the sensor signals, time intervals corresponding to one or more values of the sensor signals, and/or any other timing information about the sensor signal. More particularly, for example, the timer may be used to track and record a period of time during which the key moves between the "top" position and the "end" position (e.g., $T_{TOP\_TO\_END}$). During this period of time, the sensor signals may be acquired by one or more sensors. And the sensor signal may also be updated in one or more steps.

In step 1002, the processing device 114 may determine whether a first value of the sensor signal exceeds a first reference value corresponding to a fourth position of the key. The first value of the sensor signal may be obtained at a first time instant. The fourth position may be a position located between the "top" position and the "end" position. For example, the fourth position may be the same as the second position as described in connection with FIG. 2E above and the first reference value may be the reference value 283. In some embodiments, the processing device 114 may determine that the first value of the sensor signal exceeds the first reference value in response to determining that the first value of the sensor signal is greater than the first reference value.

In some embodiments, in response to determining that the first value of the sensor signal is greater than the first reference value (e.g., "Yes" in step 1002), the processing device 114 may determine that the key is located at a position between the fourth position and a fifth position (e.g., the "end" position). The processing device 114 may also proceed to step 1003. Alternatively, in response to determining that the first value of the sensor signal is not greater than the first reference value (e.g., "No" in step 1002), the processing device 114 may go to step 1006. The processing device 114 may further determine whether the key has not been depressed, or whether the key is released and moves back to the "top" position.

In step 1003, the processing device 114 may generate a first indication that the key has reached the fourth position. The first indication may include any suitable data that can indicate whether the key has reached the fourth position. For example, the first indication may be and/or include a numerical value, a bit (e.g., "0" or "1"), and/or any other value. As another example, the first indication may be and/or include logical data (e.g., "true" or "false"). In some embodiments, the first indication may be a flag including one or more bits (also referred as the first flag). The value of the first flag may be changed from zero to one in step 1003 if the first value of the sensor signal is greater than the first reference value. The first indication may be stored in any suitable device.

In step 1004, the processing device 114 may determine whether the key has reached the fifth position. In some embodiments, the fifth position may be the same as the third position as described in connection with FIG. 2E above. For example, the processing device 114 can acquire a second value of the sensor signal at a second time instant. The processing engine 114 may then determine whether the second value of the sensor signal exceeds the value of a second reference value corresponding to the fifth position (e.g., the reference value 285 as described in connection with FIG. 2E above). In response to determining that the second value of the sensor signal is greater than the second reference value, the processing device 114 may determine that the key has reached the "end" position at the second time instant. The processing device 114 may also proceed to step 1005 and may generate a second indication that the key has reached the fifth position. The second indication may include any suitable data that can indicate whether the key has reached the fifth position. For example, the second indication may be and/or include a numerical value, a bit (e.g., "0" or "1"), and/or any other value. As another example, the second indication may be and/or include logical data (e.g., "true" or "false"). In some embodiments, the second indication may be a flag including one or more bits (also referred as the second flag). The value of the second flag may be set to one in step 1004 if the key has reached the fifth position. The second indication may be stored in any suitable device.

Alternatively, in response to determining that the key has not reached the fifth position (e.g., "No" in step 1004), the processing device 114 may determine that the key has not reached the fifth position or that the key may be released from the fifth position. The processing device 114 may also proceed to step 1006.

In step 1006, the processing device 114 may determine whether the key has reached a sixth position. In some embodiments, the sixth position may be the same as the first position (the "top" position) as described in connection with FIG. 2E above. For example, the processing device 114 can acquire a third value of the sensor signal and can determine if the third value of the sensor signal is not greater than a third reference value corresponding to the third position. The third reference value may be the reference value 281 as described in connection with FIG. 2E above. The processing device 114 may also determine whether the first indication indicates that the key has reached the fourth position and/or whether the second indication indicates that the key has reached the fifth position. For example, the processing device 114 can determine whether the values of the first flag and the second flag are both "1." In some embodiments, the processing device 114 may determine that the key has reached the sixth position in response to determining that the third value of the sensor signal is not greater than the third reference value and detecting the first indication and the second indication. More particularly, for example, the processing device 114 can determine that the key has reached the fifth position (e.g., the "end" position) previously and has passed the sixth position. The processing device 114 may also go to step 1007.

In some embodiments, in response to determining that the third value of the sensor signal is equal to or greater than the third reference value, the processing device 114 may further determine positional information about the key based on the first indication and/or the second indication. For example, in response to that the first indication indicates that the key has reached the fourth position and that the second indication indicates that the key has not reached the fifth position, the processing device 114 may determine that the key has been depressed but has not reached the fifth position (e.g., the "end" position). As another example, in response to determining that the first indication indicates that the key has not reached the fourth position and that the second indication indicates that the key has reached the fifth position, the processing device 114 can determine that the key was released from the sixth position and currently stays at the fourth position (e.g., the "top" position). As still another example, responsive to a failure to detecting the first indication and the second indication (e.g., upon determining that the values of the first flag and the second flag are "0"), the processing device 114 may determine that the key was not depressed and currently stays at the "top" position. The processing device 114 may go to step 1010 in response to determining that the key has not reached the sixth position (e.g., "No" at 1006).

In step 1007, the processing device 114 can generate a third indication that the key has not reached the fourth position. For example, the third indication can be generated by setting the value of the first flag to "0".

In step 1008, the processing device 114 can generate a fourth indication that the key has not reached the fifth position. For example, the fourth indication can be generated by setting the value of the second flag to "0".

In step 1009, information about the sensor signal may be determined and/or stored. For example, one or values of the sensor signal (the first value, the second value, the third value of the sensor signal, etc.) may be determined/or stored. As another example, the processing device 114 can determine, process, and/or store timing information about the sensor signal, such as the first time instant, the second time instant, the third time instant, one or more time intervals (e.g., a time interval between multiple time instants), etc. In a more particular example, the processing device 114 can determine a period of time during which the key moves between the fourth position and the fifth position, for example, by determining a time interval between the first time instant and the second time instant.

In step 1010, the sensor signals, the first and second flag value, the period of time during which the key moves between the "top" position and the "end" position ($T_{TOP\_TO\_END}$) may be sent to the musical system 100 for processing. Merely by way of example, the processing exemplified in step 1008 may include determining positions of the key, calculating depressing velocity of the key, calculating depressing strength, etc.

In some embodiments, process 1000 can be performed iteratively. For example, upon performing step 1010, the processing device 114 can loop back to step 1001. In some embodiments, the processing device 114 can conclude in response to receiving an instruction for concluding the process (e.g., a break signal, etc.).

Figure 11:
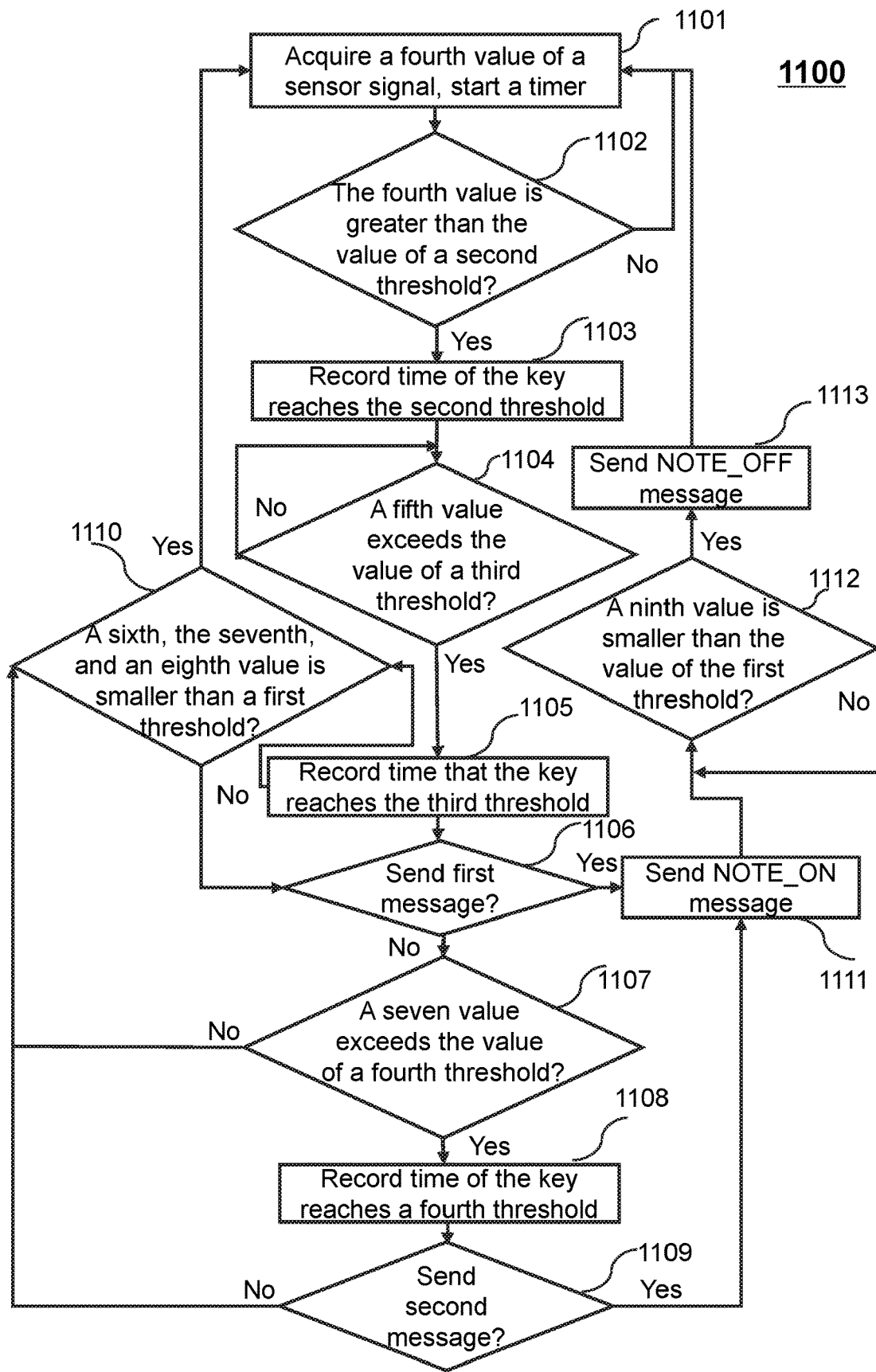
FIG. 11 is a flowchart illustrating an exemplary process for acquiring sensor signal according to some embodiments of the present disclosure.

FIG. 11 is a flowchart illustrating exemplary process 1100 for acquiring a sensor signal of a key according to some embodiments of the present disclosure. In some implementations, process 1100 may be performed by the processing device 114.

In step 1101, the processing device 114 may acquire a fourth value of a sensor signal (e.g., a sensor signal S) of the key and start a timer for time recording. The time to be recorded may include time of the key reaching positions represented by each threshold. The sensor signal S may be acquired by one or more sensors. And the sensor signal S may also be updated in one or more of the following steps.

In step 1102, the processing device 114 may determine if the fourth value of the sensor signal is greater than the value of the second threshold (e.g., "TOP" as described in connection with FIG. 2F above). If the value of the sensor signal S is greater than the value of TOP, the key has been depressed and has passed position represented by the second threshold TOP and the processing device 114 may then go to step 1103. If the value of the sensor signal S is not greater than (e.g., smaller than or equal to) the value of TOP, the key is currently located in a section between the position represented by the second threshold TOP and the "top" position. The processing device 114 may then loop back to step 1101 and wait till the key reaches the position represented by the second threshold TOP.

In step 1103, time that the key reaches the position represented by the second threshold TOP (e.g., TOP_TIME) may be recorded. Then the key may keep moving towards the "end" position, and the processing device 114 may then go to step 1104.

In step 1104, a fifth value of the sensor signal S may be obtained at a new position of the key. The smart piano system may determine if the fifth value of the sensor signal exceeds the value of the third threshold MID. If the fifth value of the sensor signal exceeds the third threshold MID (e.g., a "Yes" in step 1204), the key has passed position represented by the third threshold MID, and the processing device 114 may then go to step 1105. If the fifth value of the sensor signal is not greater than (smaller than, or equal to) the value of the third threshold MID (e.g., a "No" in step 1104), the processing device 114 may then loop back to step 1104 and wait till the key reaches the position represented by the third threshold MID.

In step 1105, a time instant that the key reaches the position represented by the third threshold MID (e.g., MID_TIME) may be recorded. The key may keep moving (either be depressed towards the "end" position, or move back to the "top" position), and a sixth value of the sensor signal may be acquired. Then, the processing device 114 may go to step 1106 and step 1110.

In step 1106, the processing device 114 may determine if a first message regarding the sensor signal may be provided. Merely by way of example, the first message may include MID_TIME, TOP_TIME, and three values of the sensor signal. In some embodiments, the determination in step 1106 may be performed by checking if the difference between the MID_TIME and TOP_TIME reaches a predefined value. The predefined value may be based on results of several tests performed on the musical system 100 (as described in connection with FIG. 1 above). Merely by way of example, the tests may be performed by depressing each key one or more times, calculating the depressing strength of each time of depressing, and recording time of the key reaching positions represented by each threshold. The depressing strength and the time may be used as a reference to the predefined value. In step 1106, if the processing device 114 determines to provide the first message ("Yes" in step 1106), the processing device 114 may go to step 1111. If the first message may not be provided ("No" in step 1106), the processing device 114 may go to step 1107. After step 1106, the key may keep moving, and a seventh value of the sensor signal may be acquired.

In step 1107, the processing device 114 may determine if the seventh value of the sensor signal exceeds the value of the fourth threshold TAIL. If the seventh value of the sensor signal exceeds the value of the fourth threshold TAIL, the processing device 114 may go to step 1108. If the seventh value of the sensor signal does not exceed (e.g., being smaller than or equal to) the value of the fourth threshold TAIL, the processing device 114 may go to step 1110.

In step 1108, the processing device 114 may record time of the key reaches a position represented by the fourth threshold (e.g., TAIL_TIME). Then the processing device 114 may go to step 1109.

In step 1109, the processing device 114 may determine if a second message regarding the sensor signal may be provided. Merely by way of example, the second message may include the MID_TIME, TOP_TIME, TAIL_TIME, and four values of the sensor signal. In some embodiments, the determination in step 1109 may be performed by checking if the difference between the TAIL_TIME and TOP_TIME reaches a predefined value. The predefined value may be based on results of several tests performed on the keys of the musical system 100 (as described in connection with FIG. 1). Merely by way of example, the tests may be performed by depressing each key one or more times, calculating the depressing strength of each time of depressing, and recording time of the key reaching positions represented by each threshold. The depressing strength and the time may be used as a reference to the predefined value. If the processing device 114 determines to provide the second message (a "Yes" in step 1109), the processing device 114 may then go to step 1111. If the processing device 114 determines not to provide the second message (a "No" in step 1109), the processing device 114 may then go to step 1110. After step 1109, the key may keep moving, and an eighth value of the sensor signal may be acquired.

In step 1110, the processing device 114 may determine if the sixth value (after step 1205), the seventh value (after step 1207) and/or the eighth value (after step 1109) of sensor signal S is smaller than the first threshold TOP_UP. If the value(s) of the sensor signal is smaller than the value of TOP_UP, the key may move back to the "top" position, and be located in a section between a position represented by the first threshold TOP_UP and the "top" position, and the processing device 114 may go back to step 1101. If the value(s) of the sensor signal is not smaller than the value of TOP_UP, the key may be located in a section between a position represented by the first threshold TOP_UP and the "end" position, and the processing device 114 may go back to step 1106.

In step 1111, the first and second messages may be converted to NOTE_ON message. The NOTE_ON message may include time for the musical system 100 to start to generate a musical note, sound frequency and/or loudness of the musical note, etc. After the step 1111, the key may keep moving, and a ninth value of the sensor signal may be acquired. Then the process may go to step 1112.

In step 1112, the processing device 114 may then determine if the ninth value of the sensor signal is smaller than the value of the first threshold TOP_UP. If the ninth value of the sensor signal is smaller than the value of TOP_UP, the key may move back to the "top" position, and be located in a section between a position represented by the first threshold TOP_UP and the "top" position. Then the processing device 114 may provide NOTE_OFF message in step 1113. The NOTE_OFF message may include time for the musical system 100 to end generating the musical note, instructions to record the sound frequency and loudness of the musical note, etc. If the ninth value of the sensor signal is not smaller than (greater than, or equal to) the value of TOP_UP, the processing device 114 may loop back to step 1102 and wait till the key passes the position represented by the first threshold TOP_UP.

It should be noted that the processes for signal acquisition provided above are provided for illustration, and not intended to limit the scope of the present disclosure. Apparently, for persons having ordinary skills in the art, numerous variations and modifications may be conducted under the teaching of the present disclosure. However, those variations and modifications may not depart the protecting scope of the present disclosure.

It should be noted that the above steps of the flow diagrams of FIGS. 5-11 can be executed or performed in any order or sequence not limited to the order and sequence shown and described in the figures. Also, some of the above steps of the flow diagrams of FIGS. 5-11 can be executed or performed substantially simultaneously where appropriate or in parallel to reduce latency and processing times. Furthermore, it should be noted that FIGS. 5-11 are provided as examples only. At least some of the steps shown in these figures can be performed in a different order than represented, performed concurrently, or altogether omitted.

In some implementations, any suitable machine-readable storage media can be used for storing instructions for performing the functions and/or processes described herein. For example, in some implementations, storage media can be transitory or non-transitory. For example, non-transitory storage media can include media such as magnetic media (such as hard disks, floppy disks, etc.), optical media (such as compact discs, digital video discs, Blu-ray discs, etc.), semiconductor media (such as flash memory, electrically programmable read-only memory (EPROM), electrically erasable programmable read-only memory (EEPROM), etc.), any suitable media that is not fleeting or devoid of any semblance of permanence during transmission, and/or any suitable tangible media. As another example, transitory storage media can include signals on networks, in wires, conductors, optical fibers, circuits, any suitable media that is fleeting and devoid of any semblance of permanence during transmission, and/or any suitable intangible media.

It should be noted that the above description of the processes for calibrating a musical instrument is merely provided for illustration, and not intended to limit the scope of the present disclosure. For persons having ordinary skills in the art, multiple variations and modifications may be made under the teachings of the present disclosure. In some embodiments, other steps may be added into the method 800. For example, the intermediated data and/or the final data of the method 800 may be stored in any storage disclosed elsewhere in the present disclosure. As another example, step 816 may be optional, and the calibration module 406 may select the intensity levels from intensity level 0 to intensity level 127 (or from intensity level 127 to intensity level 0), obtain corresponding sensor signals, and update the second relationship accordingly.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "calculating," "executing," "storing," "producing," "determining," "obtaining," "calibrating," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," etc. as used herein are meant as labels to distinguish among different elements and may not necessarily have an ordinal meaning according to their numerical designation.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the present disclosure are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A system for calibrating a musical device, comprising:
   a memory; and
   at least one processor configured to communicate with the memory, to:
   select a first intensity level from a plurality of predetermined intensity levels, the first intensity level corresponding to a first reference sensor signal according to mapping information;
   energize an actuator to actuate a key using a force corresponding to the first intensity level;
   obtain, from a sensor, a first sensor signal representing motion information of the key corresponding to application of the force;
   calibrate the musical device based at least in part on the first sensor signal by updating the mapping information,
   wherein to update the mapping information, the processor is further to:
   determine a second intensity level representing a lower limit of the plurality of predetermined intensity levels;
   determine a third intensity level representing an upper limit of the plurality of predetermined intensity levels; and
   update the mapping information based at least in part on the second intensity level and the third intensity level.

2. The system of claim 1, wherein to calibrate the musical device based on the first sensor signal, the processor is further to associate the first intensity level with the first sensor signal for storage.

3. The system of claim 1, wherein to calibrate the musical device based on the first sensor signal, the processor is further to update a first relationship between the first intensity level and at least one musical instrument digital interface (MIDI) level based on the first sensor signal.

4. The system of claim 1, to determine the second intensity level, the processor is further to:
   identify a first original intensity level, a second original intensity level, and a third original intensity level, wherein the third original intensity level is an intensity level between the first original intensity level and the second original intensity level;
   determine whether the third original intensity level is adjacent to the second original intensity level;
   in response to determining that the second original intensity level is not adjacent to the third original intensity level, energize an actuator to actuate a key based on the second original intensity level;
   detect a signal indicative of depression of the key; and
   determine the second intensity level based on the signal.

5. The system of claim 1, wherein to update the mapping information, the processor is further to:
   determine a difference between a value of the second intensity level and a value of the third intensity level; and
   update the mapping information based at least in part on the difference.

6. The system of claim 1, wherein to update the mapping information, the processor is further to:
   determine a second reference sensor signal corresponding to the second intensity level according to the mapping information;
   and update the mapping information based at least in part on the second reference sensor signal and the third intensity level.

7. The system of claim 6, wherein to update the mapping information based at least in part on the second reference sensor signal and the third intensity level, the processor is further to:
   update the mapping information based on an interpolation method.

8. The system of claim 7, wherein the interpolation method comprises at least one of a linear interpolation, a polynomial interpolation, or a spline interpolation.

9. The system of claim 1, wherein the sensor comprises at least one of an opto-electric sensor, a magneto-electric sensor, or a piezo-electric sensor.

10. The system of claim 2, to associate the first intensity level with the first sensor signal for storage, the processes is further configured to:
    store information related to the intensity level in association with one or more portions of the first sensor signal, wherein the information related to the intensity level includes number of the intensity level and an amount of force corresponding to the intensity level.

11. A method, comprising:
    selecting a first intensity level from a plurality of predetermined intensity levels, the first intensity level corresponding to a first reference sensor signal according to mapping information;
    energizing an actuator to actuate a key using a force corresponding to the first intensity level;
    obtaining, from a sensor, a first sensor signal representing motion information of the key corresponding to application of the force; and
    calibrating, by a processor, the musical device based at least in part on the first sensor signal by updating mapping information,
    wherein to update the mapping information, the processor is further to:
    determine a second intensity level representing a lower limit of the plurality of predetermined intensity levels;
    determine a third intensity level representing an upper limit of the plurality of predetermined intensity levels; and
    update the mapping information based at least part in on the second intensity level and the third intensity level.

12. The method of claim 11, wherein calibrating the musical device based on the first sensor signal comprises:

associate the first intensity level with the first sensor signal for storage.

13. The method of claim 11, wherein calibrating the musical device based on the first sensor signal comprises:
updating a first relationship between the first intensity level and at least one musical instrument digital interface (MIDI) level based on the first sensor signal.

14. The method of claim 11, wherein updating the mapping information comprises:
determining a difference between a value of the second intensity level and a value of the third intensity level; and
updating the mapping information based at least in part on the difference.

15. The method of claim 11, wherein updating the mapping information comprises:
determining a second reference sensor signal corresponding to the second intensity level according to the mapping information; and
updating the mapping information based on the at least in part on the second reference sensor signal and the third intensity level.

16. The method of claim 15, wherein to update the mapping information based at least in part on the second reference sensor signal and the third intensity level, the processor is further to:
update the mapping information based on an interpolation method.

17. The method of claim 16, wherein the interpolation method comprises at least one of a linear interpolation, a polynomial interpolation, or a spline interpolation.

18. The method of claim 11, wherein the sensor comprises at least one of an opto-electric sensor, a magneto-electric sensor, or a piezo-electric sensor.

19. The method of claim 12, wherein associating the first intensity level with the first sensor signal for storage comprises:
storing information related to the intensity level in association with one or more portions of the first sensor signal, wherein the information related to the intensity level includes number of the intensity level and an amount of force corresponding to the intensity level.

* * * * *